(12) United States Patent
Guigli

(10) Patent No.: US 9,813,303 B1
(45) Date of Patent: Nov. 7, 2017

(54) ENABLING CROSS-REALM AUTHENTICATION BETWEEN TENANT AND CLOUD SERVICE PROVIDER

(71) Applicant: IP Company 8, LLC, Natick, MA (US)

(72) Inventor: Michael Guigli, Natick, MA (US)

(73) Assignee: IP Company 8, LLC

( * ) Notice: Subject to any disclaimer, the term of this patent is extended or adjusted under 35 U.S.C. 154(b) by 0 days.

(21) Appl. No.: 15/473,873

(22) Filed: Mar. 30, 2017

(51) Int. Cl.
*G06F 15/177* (2006.01)
*H04L 12/24* (2006.01)
*H04L 29/12* (2006.01)
*H04L 12/46* (2006.01)
*H04L 29/08* (2006.01)
*H04L 29/06* (2006.01)

(52) U.S. Cl.
CPC ......... *H04L 41/12* (2013.01); *H04L 12/4641* (2013.01); *H04L 61/1511* (2013.01); *H04L 61/2015* (2013.01); *H04L 63/029* (2013.01); *H04L 63/0807* (2013.01); *H04L 67/10* (2013.01)

(58) Field of Classification Search
USPC ....................................................... 709/220
See application file for complete search history.

(56) References Cited

U.S. PATENT DOCUMENTS

2012/0331142 A1* 12/2012 Mittal .................. H04L 49/354
709/225
2015/0172331 A1* 6/2015 Raman ................. H04L 65/403
709/204

* cited by examiner

*Primary Examiner* — Hee Soo Kim
(74) *Attorney, Agent, or Firm* — Mintz Levin Cohn Ferris Glovsky and Popeo, P.C.

(57) ABSTRACT

A first network adapter is inserted into a first resource server of each tenant of a plurality of tenants serviced by a cloud service provider. The first network adapter is configured to be controlled by the cloud service provider. The first resource server of each tenant includes a second network adapter configured to be controlled by the tenant. Each of the first network adapter is operably coupled with an interconnection network infrastructure. The interconnection network infrastructure is operably coupled with cloud service provider infrastructure. Related methods, techniques, apparatuses, systems, non-transitory computer program products, and articles are also described.

58 Claims, 9 Drawing Sheets

ENABLING CROSS-REALM AUTHENTICATION BETWEEN TENANT AND CLOUD SERVICE PROVIDER

TECHNICAL FIELD

The subject matter described herein relates to networking architectures. For example, where tenants deploying virtual machines on a cloud service provider's platform can retain control of their cloud network topology and Kerberos realm, while still securely accessing services from computer resources joined to the cloud service provider's realm ("domain").

BACKGROUND

In an Infrastructure as a Service (IaaS) computing model, cloud service providers hypothecate and comingle physical storage, compute, and network devices and allow tenants to use logically partitioned sets ("pools") of these resources to deploy virtual machines on cloud service provider-owned and managed hardware. A virtual machine is a software computer that runs an operating system much like a physical computer. The hardware is shared by multiple tenants. Tenants deploy and manage these virtual machines via web interface or API calls to a Cloud Infrastructure Manager Server ("fabric controller"). Tenants pay a subscription fee for these services and third party Operating Systems running in these virtual machines are sometimes licensed through the cloud service provider. In this model, tenants generally require exclusive control of their network pool and may define their internet protocol (IP) address space for these virtual machines in accordance with corporate policy or an internally defined schema in layer 3 of the Open Systems Interconnect (OSI) model. Therefore the cloud service provider is unable to dictate or shape a tenant's IP address assignments of the tenant's virtual machines. This is especially challenging when tenants require the ability to extend their existing external network infrastructure to these network pools (for example in a hybrid cloud computing model, or for data migration, or coexistence with on premise infrastructure in the tenant's pre-existing Kerberos realm ("domain"). As a result, IP address conflicts naturally emerge between tenants, and cloud service provider must keep these network pools isolated at layer 2 of the OSI Model in order to avoid security risks—such as denial of service—due to IP address conflicts. As a result, cloud service providers are unable to deliver any services above Layer 3 over the network to the tenant without introducing cumbersome Network Address Translations for every tenant virtual machine. Examples of such services in layer 7 of the OSI model include cloud service provider brokered CITRIX XENAPP and MICROSOFT REMOTE DESKTOP SERVICES connections.

There is a need to provide network services to each tenant of a plurality of tenants over a network, such as a corporate or internal network that has a topology unique to each tenant. The cloud service provider has an internal network topology, which is usually different from a topology of the corporate or internal network of each tenant. The topologies of the cloud service provider and each tenant may be different because each of those entities may have a unique or customized scheme of allocating IP addresses over the respective network. When the number of tenants being serviced by the cloud service provider is high, the likelihood of an IP address conflict is also high. There is a high likelihood of IP addresses conflict because there is an increased chance of a tenant assigning a computer within its internal network a particular IP address that has been already used by another tenant in its computer network. Therefore, the cloud service provider cannot concurrently provide network services to both tenants without the added complexity and limitations of network address translation for each computer in each tenant's network.

SUMMARY

In an aspect, a first network adapter is inserted into a first resource server of each tenant of a plurality of tenants serviced by a cloud service provider. The first network adapter is configured to be controlled by the cloud service provider. The first resource server of each tenant includes a second network adapter configured to be controlled by the tenant. Each of the first network adapter is operably coupled with an interconnection network infrastructure. The interconnection network infrastructure is operably coupled with cloud service provider infrastructure.

In another aspect, a second network adapter is inserted into each resource server of each tenant of a plurality of tenants serviced by a cloud service provider. The first network adapter of each resource server is fully controlled by the tenant. Each resource server of each tenant includes a first network adapter configured to be assigned an internet protocol address by the cloud service provider. A second external network interface connection is inserted into a router of each tenant of the plurality of tenants serviced by the cloud service provider. Each second network adapter is operably coupled with an interconnection network infrastructure. Each second external interface is operably coupled with an interconnection network infrastructure. The interconnection network infrastructure is operably coupled with cloud service provider infrastructure.

One or more of the following features can be included in any feasible combination. The interconnection network infrastructure can enable communication over the interconnection network infrastructure between the cloud service provider infrastructure and each tenant. The interconnection network infrastructure can disallow communication over the interconnection network infrastructure between the plurality of tenants. The tenant can further include a first directory server including a third network adapter configured to be controlled by the tenant. Each of the second network adapter and the third network adapter can be operably coupled to a first port group controlled by the tenant. The first port group can be operably coupled with a router. The operably coupling each of the first network adapter with the interconnection network infrastructure can include: operably coupling each of the first network adapter and a second external interface of the router with a second port group of type private-virtual local area network isolated, the second port group of the type isolated being controlled by the cloud service provider; and operably coupling the second port group with a third port group of a type private-virtual area network promiscuous. Each of the second port group and the third port group can be controlled by the cloud service provider.

The operably coupling the interconnection network infrastructure with the cloud service provider infrastructure can include operably coupling the third port group promiscuous with a fourth port group via a firewall, the fourth port group being controlled by the cloud service provider, the fourth port group operably coupled to a second resource server, a second directory server and a dynamic host configuration protocol server of the cloud service provider. The coupling of each of the first network adapter and the router with the second port group that is controlled by the cloud service provider can work around conflict of internet protocol addresses between the second network adapter of a tenant server and the second network adapter of another tenant server, relative to the cloud service provider network of the plurality of tenants without requiring any tenant to reconfigure a topology of tenant.

The first network adapter may not participate in intra-tenant communication to a plurality of computers within the tenant. The first network adapter may not register its cloud service provider-assigned internet protocol address in a tenant domain name server, and a service provider-assigned internet protocol address of the first network adapter's is registered in a domain name server of the service provider by the service provider. The first port group can include a virtual extensible local area network backed distributed port group or a virtual local area network-backed distributed virtual port group.

The second port group of the type isolated can include a private virtual local area network-backed distributed port group. The primary private virtual local area network identity is not equivalent to its secondary private virtual local area network identity and the second port group can be operably coupled with the third port group preventing the tenant from accessing or connecting to any other tenant.

The third port group of the type promiscuous can include a private virtual local area network backed distributed port group that is configured with a same primary private virtual local area network identity as the second port group, and a secondary private virtual local area network identity of the third port group can be the same as a primary private virtual local area network identity of the third port group. The third port group can be enabled to receive a request for service originated from any tenant of the plurality of tenants and to provide the requested service to the tenant when the tenant is authorized for the service.

The second port group can be operably coupled to the third port group via a private virtual local area network mapping trunk. The fourth port group can be a virtual local area network-backed distributed port group. The virtual local area network identity can be exclusive of any private-virtual local area network identity. The fourth port group can be operably coupled to the third port group via a firewall. The second directory server can have a separate trust relationship with the first directory server of each tenant.

One of the plurality of tenants can use a first scripted process distributed by the cloud service provider and executed on the first directory server of one of the plurality of tenants to create conditional forwarders in tenant DNS, configure the router NAT rules, and initiate the creation of bidirectional Kerberos trust between the tenant's existing or a newly created Kerberos realm and a service provider's realm. The service provider assigns an internet protocol address to a second external interface of a virtual router of the one of the plurality of tenants. The service provider can create a domain name server zone for the one of the plurality of tenant's realm name in the service provider domain name server and a record can be added to the domain name server zone that resolves a realm name of the one of the plurality of tenants to the assigned internet protocol address.

A trust password can be created by the one of the plurality of tenants via a first scripted process and stored in a cloud infrastructure manager server database along with a directory server name of the one of the plurality of tenants and a realm name of the one of the plurality of tenants. A second scripted process executing in the cloud service provider's realm can retrieve the trust password from a cloud infrastructure server database by the service provider. The second scripted process can complete the creation of the cross-realm Kerberos trust where inter-tenant internet protocol address conflicts exist with respect to tenant primary network adapters.

The details of one or more variations of the subject matter described herein are set forth in the accompanying drawings and the description below. Other features and advantages of the subject matter described herein will be apparent from the description, the drawings, and the claims.

DESCRIPTION OF DRAWINGS

Like reference symbols in the various drawings indicate like elements.

DETAILED DESCRIPTION

The subject matter described herein relates to networking architectures that support infrastructure as a service (IaaS), software defined datacenter (SDC), network function virtualization (NFV), and remote desktop/remote application, where tenants deploying virtual machines on a cloud service provider's IaaS platform have an objective of retaining control of their cloud network topology and Kerberos realm, while still securely accessing network services from resources running in the cloud service provider's Kerberos realm ("domain"). Although internet protocol (IP) address conflicts can exist between tenants, this objective can be achieved using a service-provider managed virtual network interface connection on the virtual machine, thereby eliminating the need to create network address translation rules for each tenant virtual machine.

Figure 1:
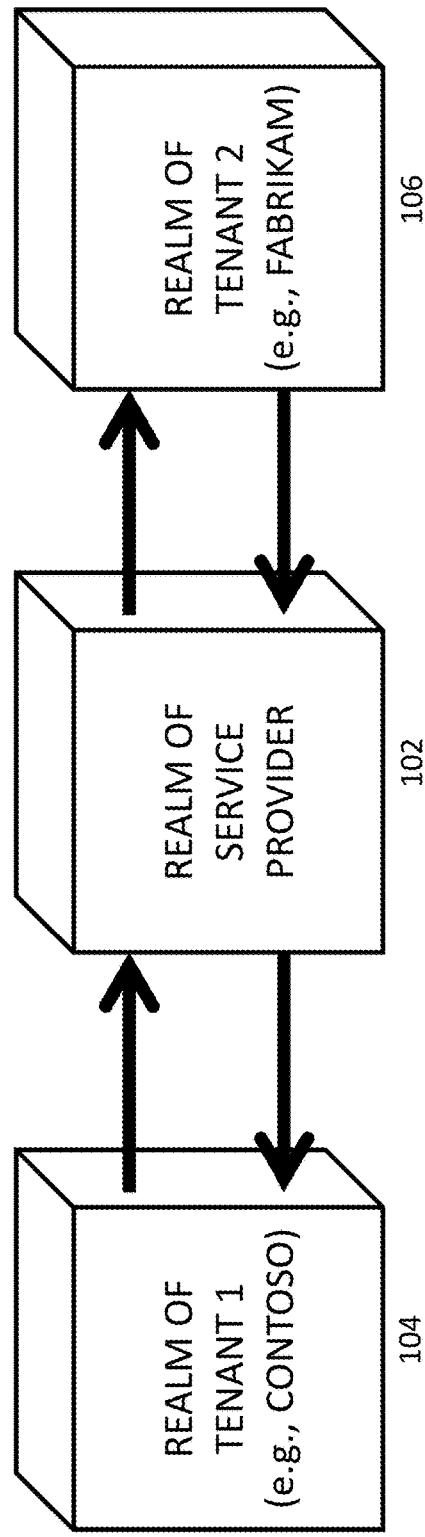
FIG. 1 illustrates a realm of a cloud service provider operably and non-transitively coupled with a realm of a first tenant and a realm of a second tenant.

FIG. 1 illustrates a realm 102 of a cloud service provider operably and non-transitively coupled with a realm 104 of a first tenant and a realm 106 of a second tenant. Realms 104 and 106 can be pre-existing realms deployed by its respective tenant administrator prior to or after tenant's initial engagement with the cloud service provider. In such circumstance, the realm can originate from its respective tenant's existing datacenter, office, campus, other service provider cloud, or span any combination thereof. An administrative user of the tenant realm (such as 104 or 106) can extend that realm to the cloud service provider's infrastructure, and initiate the creation of a trust relationship with realm 102. Thus, the cloud service provider can selectively or globally allow cloud service provider IaaS hosted virtual machines within each of those realms 104 and 106 Kerberos authenticated access to specific network services from within all the network services provided by the cloud service provider. For example, the cloud service provider can provide different or overlapping services to each of the realms 104 and 106. Each of the realms 102, 104 and 106 can have different network topologies, as each of those entities can have a unique or customized scheme of allocating internet protocol (IP) addresses over the respective network. Although two tenants have been shown in FIG. 1, in alternate implementations the cloud service provider serves many more tenants and thus many more (i.e. thousands of) realms. When the number of tenants being serviced by the cloud service provider is high, the likelihood of an IP address conflict between tenants is also high because there is an increased chance of the tenant assigning to a computer within a realm (e.g., 104) of a tenant (e.g., tenant 1) a particular IP address that has been assigned by that tenant (e.g., tenant 1) to another computer. These are private networks, and therefore each tenant's IP address selection is largely limited to those specified in RFC 1918. The networking architecture described herein can allow such IP address conflicts to exist harmlessly—enable the cloud service provider to securely deliver services to each tenant—while avoiding having a tenant reconfigure the topology according to the preferences of the cloud service provider. This network architecture that allows for these IP address conflicts while avoiding having a tenant reconfigure the topology according to the preferences of the cloud service provider is described by FIGS. 2 and 3, which are described in more detail below. A process of configuring this networking architecture is further described in FIG. 4-6, which are discussed below.

The realms 102, 104, and 106 can be Kerberos realms. Kerberos is a network authentication protocol developed and maintained by the Massachusetts Institute of Technology that authenticates known computers and users using secret-key cryptography. Computers and users with accounts in the directory servers of their respective realms can mutually authenticate with computers and users with accounts in the directory server of the same realm. When a bidirectional cross-realm trust is created between the directory servers of realms 104 and 102, users and computers in realm 104 can mutually authenticate using Kerberos with computers in realm 102 and vice versa. Similarly, when a bidirectional cross-realm trust is created between the directory servers of realms 106 and 102, computers and users in realm 106 can mutually authenticate using Kerberos with computers and users in realm 102 and vice versa. When this ability to authenticate across realms using Kerberos exists, administrators in each realm can enable users and computers from a trusted realm to have Kerberos authenticated access to network services and resources located in their own realm.

As the tenants 104 and 106 should not have to access the internal networks of each other, those tenants 104 and 106 may not authenticate with each other as such realm trusts are nontransitive. In other words, each of realms 104 and 106 may not trust each other, but each of them can trust the realm 102; and the realm 102 can trust realms 104 and 106. In this implementation, such authentication attempts between realms 104 and 106 are also filtered by layer 2 separation of the resources of realm 104 from the resources of realm 106, which is described herein. Trust relationships between Kerberos realms can be formed on any operating system which supports this network authentication protocol, such as WINDOWS, LINUX, or any other platform, and therefore this subject matter is operating system agnostic. Such a trust relationship can be referred to as a forest trust or external trust in WINDOWS, or a realm trust in LINUX. WINDOWS can also refer to realms as forests. Administrative partitions of more complex WINDOWS forests are known as domains in WINDOWS. As described herein, a different network authentication protocol can be used to extend this solution to scenarios where these WINDOWS domains are the perimeter for such trust relationship instead of the entire WINDOWS forest ("External Trust").

For each Kerberos realm, there is at least one directory server ("domain controller"), which can be a virtual machine with an operating system that further includes a TCP/IP stack, a directory service, key distribution center, DNS service, network time protocol service, an authentication service, and a ticket granting service. This implementation assumes these required services are running on the Directory Server, however other implementations of this same design may choose to disperse these services across multiple servers and/or implement redundant instances of these services. This implementation also functions as described in such augmented fault tolerant implementations. The directory server running the authentication service can receive, from a computer with a realm 104 or 106, a network service request, which includes the DNS name of the computer as configured by an administrator of the realm 104 or 106 to identify the computer, and an identification of the requested network service. Realm 102 uses its own authoritative DNS service to resolve the IP address of the computer as seen by realm 102, and computer resources in realm 102 communicate with the requesting resource in realm 104 or 106 using the service provider-assigned IP address on the service-provider designated network interface connection. This is further illustrated by FIG. 2.

The authentication service (directory server) can then authenticate the computer. If the computer is authenticated as registered to receive the requested network service, the ticket granting service can generate an encrypted ticket that the ticket granting server then sends to the computer along with a service session key and a service secret key to decrypt the ticket. The ticket to the requested network service can enable the requesting computer to access the network service. The mutual authentication here can be advantageously performed without transmitting passwords over the network. Kerberos, among other network authentication protocols rely on the avoidance of IP address conflicts in order to properly function. By using the service provider network interface connection on the tenant computer exclusively for all cloud provider initiated communication with such resource server, authenticating, inter-tenant IP address conflicts are prevented from undermining Kerberos.

Figure 2:
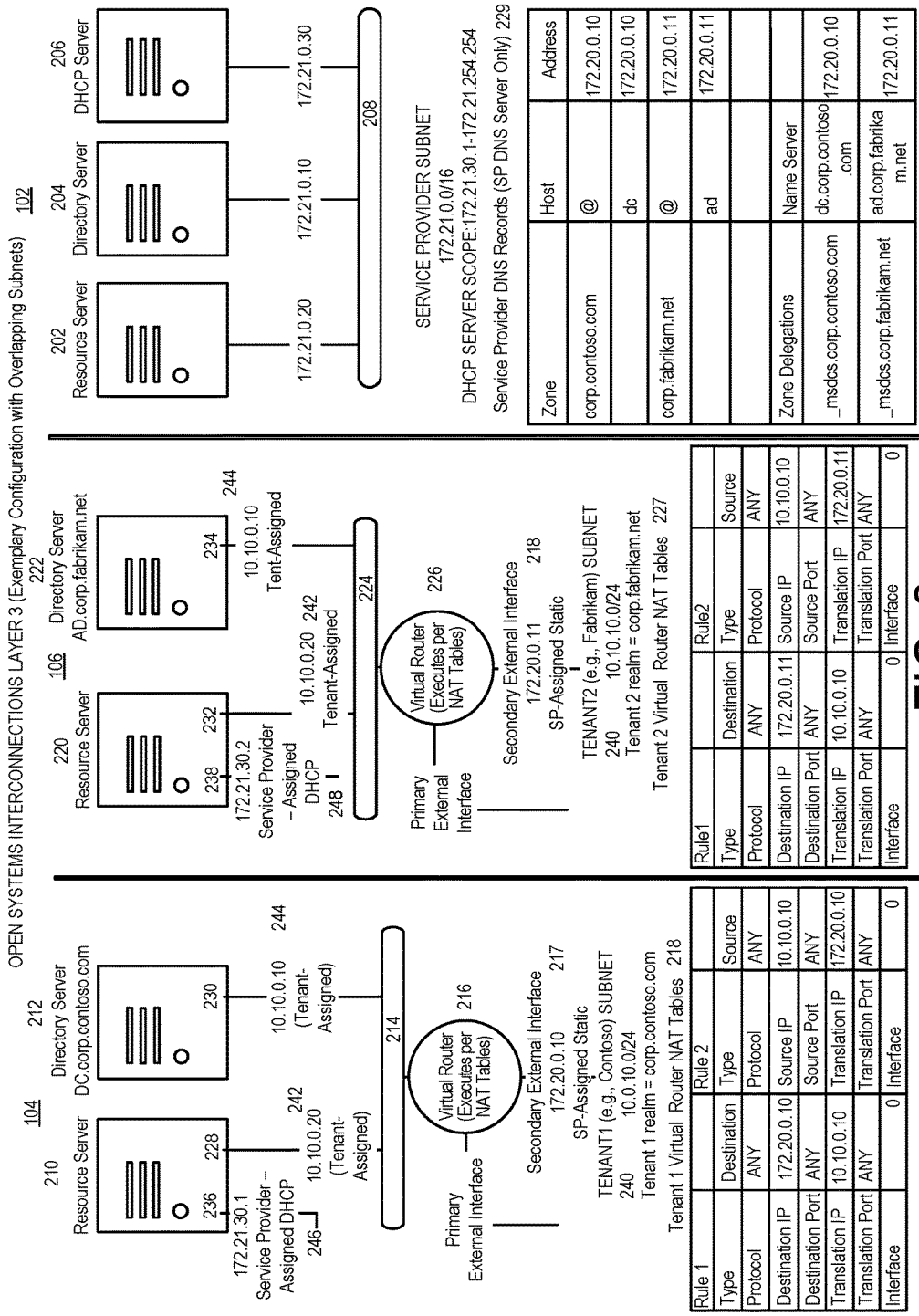
FIG. 2 illustrates a layer 3 networking architecture that shows IP address conflicts between two arbitrary tenants while avoiding having a tenant reconfigure the topology according to the preferences of the cloud service provider.

FIG. 2 illustrates a networking architecture that allows for IP address conflicts on a given tenant's virtual machine's primary network interface connection relative to any other tenant's primary network interface connection on any of such other tenant's virtual machines, thus avoiding having a tenant reconfigure the topology according to the preferences of the cloud service provider. The tenant, therefore, can provision their own virtual machines and manage their own Network without approval or guidance from the cloud service provider. The realm 102 can include a resource server 202, a directory server 204, a dynamic host configuration protocol (DHCP) server 206, and virtual local area network (VLAN)—backed distributed virtual port group 208. The realm 104 can include a resource server 210, a directory server (also referred to as DNS) 212, a virtual extensible local area network (VXLAN)—backed distributed virtual port group 214, and a virtual router 216 configured to perform routing based on network address translation (NAT) tables 218. The realm 106 can include a resource server 220, a directory server (also running the required Kerberos services) 222, a virtual extensible local area network (VXLAN)—backed distributed virtual port group 224, and a virtual router 226 configured to perform routing based on NAT tables 227. The term port group referred herein can also be called a virtual computer network switch. Note that the VXLAN backed distributed virtual port groups can be replaced with VLAN backed distributed virtual port groups. This implementation uses VXLAN for better scalability and to enable tenant's self-service provisioning of such port groups. Alternative implementations without VXLAN capabilities may use VLAN-backed port groups instead, and the network administrator of the cloud provider must assign a unique VLAN id to each such tenant port group.

The resource server 202 can provide network services to the realms 104 and 106. The directory server 204 can host the DNS records 229 to resolve tenant's computers using the service-provider assigned IP address. Some of the records 229, such as @ and "realm name" or DNS zone name are created during initial enrollment process. As tenant provisions virtual machines ("computers") throughout tenant's lifecycle, the DHCP server 206 can assign unique IP addresses to the second network interface connection of computers in realm 104 and the realm 106. The DHCP server 206 registers the A record for such IP Address assignment in service provider's DNS records 229 in the DNS zone corresponding to the tenant's realm name ("zone name" in DNS). The resource servers 210 and 220 can be operably coupled to the realm 102 to participate in Kerberos-authenticated network services with realm 102 using the second network interface connection.

The tenant's directory server 212 can access the authorized computer resources of the realm 102 using a routed network connection through virtual router 216 provided the virtual router 216 is programmed with the network address translation (NAT) rules defined in 218, and the directory server 222 can access the authorized computer resources of the realm 102 using a routed connection through virtual router 226 when the virtual router 226 is programmed with the NAT rules defined in 227. An administrator of tenant Contoso has administrator access to program virtual router 216, except for the service provider (SP)-assigned static interface (also referred to as a router external interface). An administrator of tenant Fabrikam has administrator access to program virtual router 226, except for the SP-assigned static interface (e.g., router external interface). The tenant directory servers 212 and 222 contain a conditional forwarder in their own DNS service that forwards/relays all DNS lookups associated with realm 102 to the service provider's directory server 204. NAT can be performed for only the directory servers 212 and 222, and is not required for the resource servers 210 and 220, thereby ensuring scalability (because every time a resource server is added, a NAT rule is not required). NAT rules are not specifically required for the directory server, however introducing a NAT router allows the directory server to use a single network interface connection, in order to comply with supported configuration requirements of some operating system vendors.

Among other virtual machines, the resource server 210 and the directory server 212 can be operably coupled to the VXLAN-backed distributed virtual port group 214 via network adapters 228 and 230, respectively. The VXLAN-backed distributed virtual port group 214 can be operably coupled to the virtual router 216, which can perform routing as per NAT tables 218. The resource server 220 and the directory server 222 can be operably coupled to the VXLAN-backed distributed virtual port group 224 via network adapters 232 and 234, respectively. The VXLAN-backed distributed virtual port group 224 can be operably coupled to the virtual router 226, which can perform routing as per NAT tables 227. Tenant 1 (Contoso) has control over the network adapters 228 and 230, and thus these network adapters are also referred to as tenant-controlled network adapters. Tenant 2 (Fabrikam) has control over the network adapters 232 and 234, and therefore these networks are also called tenant-controlled network adapters.

Figure 3:
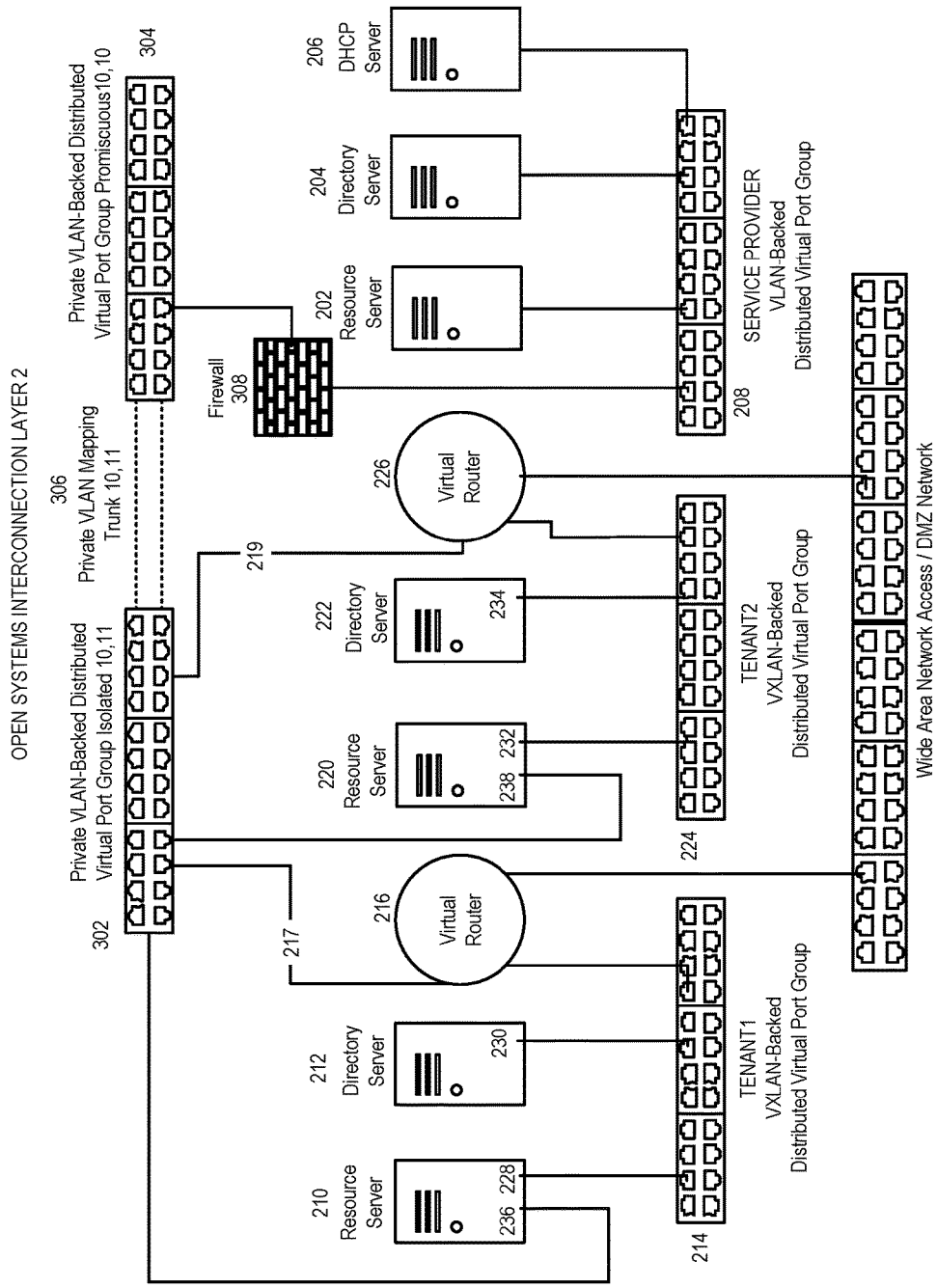
FIG. 3 illustrates the layer 2 networking architecture of FIG. 2 and additionally shows an infrastructure that the cloud service provider implements to access the cloud service provider controlled network adapters and avoid IP conflicts.

There can be situations where two or more tenants such as tenant 1 and tenant 2 pick by chance the same subnet. In FIG. 2, by random chance, tenant 1 and tenant 2 have picked on the same subnet (e.g., 10.0.10.0/24) 240, which can risk computers in realm 104 and computers in realm 106 to use the same IP addresses. FIG. 3 illustrates this IP address "conflict" as 228 has the same IP address as 232 and 230 has the same IP address as 234. As a result, the tenant-controlled network adapters 232 and 234 of the realm 106 uses the same IP addresses (e.g., 10.10.0.20 and 10.10.0.10, respectively) 242 and 244, respectively, as those used by the tenant-controlled network adaptors 228 and 230. To coexist with such IP address conflict, a second network adapter 236 can be inserted into each resource server (such as 210) and a second adapter 238 is inserted into the resource server 220. Each tenant cedes configuration of their resource servers' second adapter (such as 236 and 238) to the cloud service provider's DHCP Server 206. The resource server 210 can be connected to two networks—the network of tenant 1 as well as the network of the cloud service provider. The resource server 220 can also be connected to two networks—the network of tenant 2 and the network of the cloud service provider.

The service-provider-controlled network adapter 236 can be assigned an IP address 246, from a less commonly used RFC 1918 reserved subnet (e.g., 172.21.0.0/16), by the DHCP server 206. The service-provider-controlled network adapter 238 can be assigned an IP address (e.g., 172.21.30.2) 248 by the DHCP server 206. As the cloud service provider has control over the service-provider-controlled network adapters 236 and 238, the IP Addresses 246 and 248 assigned to the service-provider-controlled network adapters 236 and 238, respectively, can be different so that there is no IP address conflict between realms 104 and 106 as seen from the perspective of realm 102, thereby ensuring a secure IP address conflict-free distribution of network services by the cloud service provider to each tenant.

Because each of the servers ("computers") are virtual machines, the service-provider-controlled network adapters 236 and 238 can be implemented using virtual hardware thereby making the technology a configuration setting rather than requiring hardware purchase and installation, and thus easily scalable to any number of tenants (e.g., no physical network adapter need be installed into a physical computer as part of the resource server provisioning process). The service-provider-controlled network adapter 236 is largely transparent (e.g., invisible) to the other computers and DNS within the same realm 104. Similarly, the service-provider-controlled network adapter 238 can be invisible to the computers and DNS within the same realm 106. This transparency is achieved through DNS queries being handled by adapter 228 and 232 for each tenant's resource server. Because the DNS queries only resolve IP address on the tenant subnets for tenant's internal resources, all tenant internal traffic flows over adapters such as 228 and 232. However, when a DNS query is called for a resource in the service provider realm, the conditional forwarder on the respective tenant's directory server relays that request to the cloud service provider's directory server 204. Since the DNS query returns an IP address on the less commonly used service provider subnet 172.21.0.0/16, the computer opens the network connection for a session with such service provider service using the network adapter 236 or 238, respectively. Tenant 1 therefore may not need to make any changes, and may not need to register the service-provider-controlled network adapter 236 in the directory server 212. Tenant 2 similarly may not need to make any changes, and may not need to register the service-provider-controlled network adapter 238 in the directory server 222.

While the networking architecture shown in FIG. 2 describes NAT rules, in an alternate networking architecture, a second network adapter can be inserted in each directory server 212 and 222. In this scenario, no tenant virtual router is required and each tenant directory server 212 and 222 are configured similarly to a resource server in the same realm, for example resource servers 210 and 220 respectively. Because the directory servers 212 and 222 generally operate a DNS service, this second network adapter can necessitate enabling advanced settings in the operating system, which restrict the publication of the second network adapter's IP address in DNS. Additionally, it may be necessary to use a statically assigned IP address rather than one issued by the cloud service provider's DHCP server as DHCP may introduce stability issues with respect to the @ record in the cloud service provider's DNS records 229. When using a statically assigned IP address, use of IP Source Guard binds the IP address to the virtual MAC address associated with the second network interface connection, thus preventing denial of service attacks which would otherwise be a security risk associated with this type of static IP address assignment. Because vendors of some Operating Systems, such as MICROSOFT, may not provide technical support where multiple network adapters to be inserted in a directory server ("domain controller")—i.e. the design may not be validated or may "not be supported" by MICROSOFT. A virtual router approach can address original equipment manufacturer (OEM) supportability concerns.

FIG. 3 illustrates the networking architecture of FIG. 2 and additionally shows an infrastructure that the cloud service provider implements to access the service-provider-controlled network adapters 236 and 238 in order to work around the IP conflicts illustrated in FIG. 3. This infrastructure can include an interconnection network that can include a private VLAN-backed distributed virtual port group 302 of the type isolated, and another private VLAN-backed distributed virtual port group 304 of the type promiscuous. The private VLAN-backed distributed virtual port group 302 of the type isolated is also referred herein as the isolated port group 302, and the private VLAN-backed distributed virtual port group 304 of the type promiscuous is also referred herein as the promiscuous port group 304. The isolated port group 302 can communicate at layers 2 and above with (e.g., receive data or network packets from and send data or network packets to) only specifically authorized ports of the promiscuous port group 304. The promiscuous port group 304 can communicate at layers 2 and above with (e.g., receive data from and send data to) any port of the isolated port group 302. However, no port located on the isolated port group 302 can send or receive data with any other port on isolated port group 302. The isolated port group 302 can be operably coupled with the promiscuous port group 304 via a private VLAN mapping trunk 306.

This configuration can be used in both distributed virtual switches and physical switches. Distributed virtual switches running on the hypervisor provide better scalability and less provisioning overhead. In either case, the primary VLAN id is set as 10 and the secondary VLAN id is 11 (any two contiguous or noncontiguous unused VLAN ids may be selected for the ids). Therefore, the promiscuous private VLAN id is 10,10 and the isolated private VLAN is 10,11. This private VLAN mapping trunk can be expressed using the following CISCO sample switch configuration steps. This following configuration is one such configuration using a distributed virtual switch in a VMWARE environment where the underlying physical switches are not private-VLAN aware:

Define the Requisite VLAN IDs
    vlan 10
    private-vlan primary
    private-vlan association 11
    vlan 11
    private-vlan isolated
    Create the Port Group 304
    port-profile   type   vethernet   PROMISCUOUS_PROFILE_NAME
    switchport private vlan mapping 10 11
    switchport mode private-vlan promiscuous
    no shutdown
    state enabled
    vmware port-group
    Create the Port Group 302
    port-profile type vethernet
    switchport mode private-vlan host
    switchport private-vlan host-association 10 11
    no shutdown
    state enabled
    vmware port-group
    Create the Private VLAN Mapping Trunk 306
    port-profile type ethernet PROFILE_NAME
    switchport mode private-vlan trunk promiscuous
    switchport trunk allowed vlan 10-11
    switchport private-vlan trunk allowed vlan 10-11
    switchport private-vlan mapping trunk 10 11
    no shutdown
    state enabled DHCP Snooping can be implemented treating the promiscuous port group as the trusted DHCP interface for DHCP advertisement, and the isolated port group as untrusted for such DHCP advertisements and offers. Using the DHCP snooping table of IP Address to MAC address assignments, IP source guard can be enabled on the isolated port group to prevent denial of service attacks or the broadcast of a tenant-supplied static IP address on the second network interface connection (whether accidental or malicious). We note that man-in-the-middle and snooping attacks are blocked by the nature of the isolated port group and do not require IP Source Guard to prevent. The use of Kerberos authentication provides additional protection against these types of attacks.

Virtual machines with network interface connections connected to port group 302 (such as those resource servers 210 and 220 and via their respective network interface connections 236, and 238) can communicate at layers 2 and above with service-provider servers (such as 202, 204, and 206) connected to the service provider VLAN-backed port group 208. The isolated port group 302 can facilitate layer 2 connectivity between a tenant directory server (such as 212 or 222) and the service-provider servers (such as 202, 204, and 206) connected to the service provider VLAN-backed port group 208. For example, in the case of directory server 212, traffic flows from the directory server 212 via network interface connection 230 into the tenant controlled VXLAN-backed distributed virtual port group 214, to the tenant-controller virtual router 216, where the traffic is translated via aforementioned network address translation rules. The translated traffic flows from the virtual router 216 to service-provider external network interface 217 into the private VLAN-backed distributed virtual port group of the type isolated at 302.

The private VLAN mapping trunk 306 carries this communication (preserving private-vlan enforcement) from the isolated port group 302 to the private VLAN-backed distributed virtual port group of the type promiscuous at 304. The promiscuous port group 304 can be operably coupled to the VLAN-backed distributed virtual port group 208 via a firewall 308. A firewall is not necessary to the functionality of the invention; however, it should be used as a best security practice. Therefore, the design presupposes the service-provider's desire to use a firewall, and recommends its placement in this location for optimal effect. The end result is the secure flow of traffic from the directory server 212 to service-provider managed virtual machines within the service provider's Kerberos realm attached to the service provider VLAN-backed distributed virtual port group 208. Inverse communication from the service-provider managed virtual machines within the service provider's Kerberos realm attached to the service provider VLAN-backed distribute virtual port group 208 to the tenant directory server 212 is achieved by traveling the aforementioned path in reverse.

Tenant virtual machines similar to those 210 and 220 except in that they do not require service-provider initiated network communication from service provider virtual machines such as 202, 204, and 206, can still obtain those same network services without requiring a service-provider managed network adapter such as those 236 and 238. In this case, these tenant virtual machines requiring limited scope of tenant-initiated network services from the service provider can follow the same communication path as described for a tenant directory server such as those 212 and 222. However, this requires a masquerade network address translation rule on a tenant's virtual router such as those routers 216 and 226. Such masquerade network address translation rule is applied to traffic originating from a tenant's respective VXLAN-backed Distributed Virtual Port Group (such as those 214 or 224) when such traffic is leaving the tenant's virtual router's second external interface such as those external interfaces 217 or 219 that is operably coupled with the Private VLAN-backed distributed virtual port group of the type isolated 302.

As noted above with respect to FIG. 1, there exists a bidirectional trust relationship between realms 102 and 104, and another trust relationship between realms 102 and 106. For a bidirectional trust relationship between realms 102 and 104, the directory server 204 can be operably coupled to the directory server 212 in a bidirectional manner via the tenant-controlled network adapter 230, the VXLAN-backed distributed virtual port group 214, the virtual router 216, the isolated port group 302, the private VLAN mapping trunk 306, the promiscuous port group 304, the firewall 308, and the VLAN-backed distributed virtual port group 208. For a bidirectional trust relationship between realms 102 and 106, the directory server 204 can be operably coupled to the directory server 222 in a bidirectional manner via the network adapter 234, the VXLAN-backed distributed virtual port group 224, the virtual router 226, the isolated port group 302, the private VLAN mapping trunk 306, the promiscuous port group 304, the firewall 308, and the VLAN-backed distributed virtual port group 208.

Figure 4:
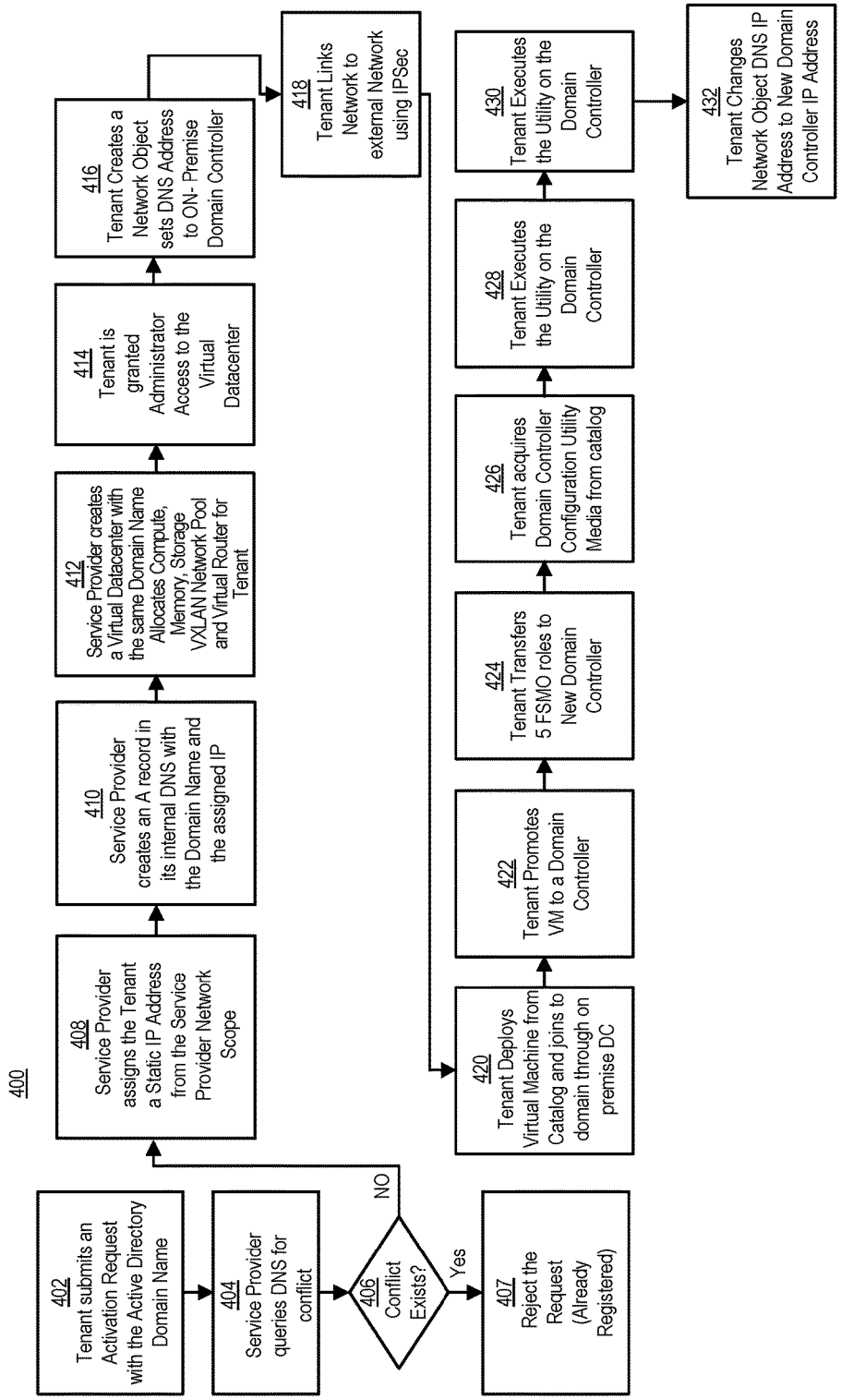
FIG. 4 illustrates a process of enrollment (which can also be referred to as onboarding, registration, or establishment) of a tenant with a cloud service provider.

FIG. 4 illustrates a process 400 of enrollment (which can also be referred to as onboarding, registration, or establishment) of a tenant with a cloud service provider. The process 400 can be required to be performed only once when that tenant first enrolls, and must be completed as a prerequisite to establish cross-realm Kerberos authentication ("the trust"). The enrollment of the tenant can be a self-service process—that is, the process 400 can be performed by the tenant without any intervention from the cloud service provider. The objective of the enrollment is to securely create a bidirectional cross-realm Kerberos trust relationship between tenant's existing Kerberos realm (e.g. 106 or 104) and the service provider's Kerberos realm 102, leveraging the networking architecture described above. The networking architecture described above describes the end result or end functionality of the self-service enrollment process (i.e. it presupposes the realm trust relationships already exist, now we address a method for a sample tenant to create such trust relationship using the above-described networking architecture as a context for the Trust creation for such sample tenant). The execution of the process 400 can, in one example, take one to two hours including tenant's manual creation of a directory server ("domain controller") in a virtual machine running on the cloud service provider's IaaS. The process 400 can be performed manually or in an automated manner. The process 400 can be performed to ensure that there are no IP address conflicts and no collisions of internal domain names ("realm names"). While avoiding of conflicts in internal network domain names can be described, in an alternate networking architecture conflicts in public internet facing domain names can also be avoided.

Prior to the enrollment, the tenant's realm 104 may or may not exist. If it exists, it may exist externally (for example at the tenant's place of business, datacenter, with another service provider, on a campus network, or any combination thereof). In this scenario, tenant seeks to extend their existing realm 104 to the service provider platform such that virtual machines created by tenant on service provider IaaS can be joined to the same tenant-controlled realm 104. This has obvious advantages for management, security, migration, and systems coexistence. Once the realm 104 is extended, tenant further seeks to create the bidirectional trust with the service provider's realm such that the tenant's virtual machines running on service provider's IaaS can begin to receive the network services (i.e. REMOTE DESKTOP SERVICES, CITRIX XENAPP, license activation, etc.) from those servers located in the service provider's realm 102. Alternatively, tenant can choose to create a new tenant realm from scratch (this is less advantageous for existing IT environments but more advantageous for new IT environments).

A tenant (e.g., tenant 1 or tenant 2) can submit, at 402, an activation request with an active directory domain name for the forest root domain or Kerberos realm name. An Active Directory Forest Root Domain Name is the MICROSOFT WINDOWS implementation of a Kerberos realm name. It should be noted that this process also works for MICROSOFT NTLM TRUSTS ("EXTERNAL TRUSTS"). In this case, cross realm authentication of resources and users is achieved using NTLM Authentication instead of the more secure Kerberos protocol. This NTLM implementation would require the service provider and tenant to both use MICROSOFT WINDOWS for their respective directory servers ("domain controllers") as NTLM is a proprietary network authentication protocol in WINDOWS.

The cloud service provider can query, at 404, the directory server 204 for domain name conflicts with other tenants. The cloud service provider can determine, at 406, whether a realm ("domain") name conflict exists. The likelihood for collision on a domain name for an internal network can often be low particularly if such realm name is a subdomain of an ARIN reserved top-level domain name. However, the checking for a domain name (realm name) conflict can provide a safety check. If there is a domain name conflict, the cloud service provider can reject, at 407, the enrollment and inform the tenant that the cloud service provider is not able to provision the tenant under that realm ("domain") name. If the cloud service provider does not detect any conflict at 406 with any other tenants, the cloud service provider can assign, at 408, to the side of the virtual router 216/226 that connects to the isolated port group 302 a static IP address from the cloud service provider network scope. The cloud service provider can control that side of the virtual router, and prevent the tenant from changing the assigned static IP address.

The cloud service provider can then create, at 410, a DNS zone in its internal directory server's 204 DNS service with the realm name as the zone name and the @ record as the tenant router's external interface IP address. The cloud service provider's directory server's DNS service is authoritative for this zone. The cloud service provider can create, at 412, a virtual datacenter with the same domain name, and can allocate to that virtual datacenter shared infrastructure resources, such as memory, VXLAN network pool, a virtual router for the tenant, and other IaaS resources. The cloud service provider can grant, at 414, administrator authentication information (e.g., login credentials) to administer the software-defined datacenter.

The tenant can create, at 416, a network object (e.g., the VXLAN-backed distributed virtual port group 214/224) and sets the directory server address to the directory server 212/222. If seeking to create a new ream, the tenant can deploy, at 420, a virtual machine from the IaaS catalog and create a Kerberos realm or promote that virtual machine to a directory server ("domain controller") on the spot in which case the virtual machine becomes the directory server 212/222. If seeking to extend tenant's existing Kerberos realm from an existing environment (office, datacenter, campus network, or any combination thereof), the tenant links or connects, at 418, the realm 104/106 of the tenant to the realm 102 using internet protocol security (IPSec), which is a protocol suite for secure IP communications. Tenant joins the virtual machine to the domain. The catalog referred here is a data storage device on the cloud service provider's IaaS, which stores images or templates of virtual machines, as well as ISO Images of software applications. These catalogs are accessible to the tenant, and the tenant can load these catalog stored virtual machine images directly into or connect tenant's pools. Tenant can similarly connect catalog stored ISO images of software applications to tenant's virtual machines through a virtual DVD method (such method is common to all hypervisors). The tenant can promote, at 422, the virtual machine to a directory server ("domain controller") of tenant's existing realm. This virtual machine becomes the directory server 212/222. If using WINDOWS, the tenant can then transfer, at 424, five flexible single master operation (FSMO) roles to the new directory server 212/222. The tenant can acquire, at 426, domain controller configuration utility ISO Image from the catalog.

Once the tenant has established a directory server such as 212 or 222 on the service provider IaaS, the tenant can execute, at 428, the realm configuration utility on the directory server (e.g., 212 or 222). This utility is the process defined in FIG. 5A-B scripted and packaged as an executable that is provided by the cloud service provider. This utility is generic and is neither customized nor specially packaged for any single tenant. The tenant can execute, at 430, the utility on the directory server 212/222. The tenant can change, at 432, the DNS IP address used by the virtual machine provisioning process to provision virtual machines, so that those virtual machines now use the newly created directory server ("domain controller") as their primary DNS server. This setting is configured by the tenant on the tenant's VXLAN-backed distributed virtual port group, such as those 214 and 224.

Figure 5A:
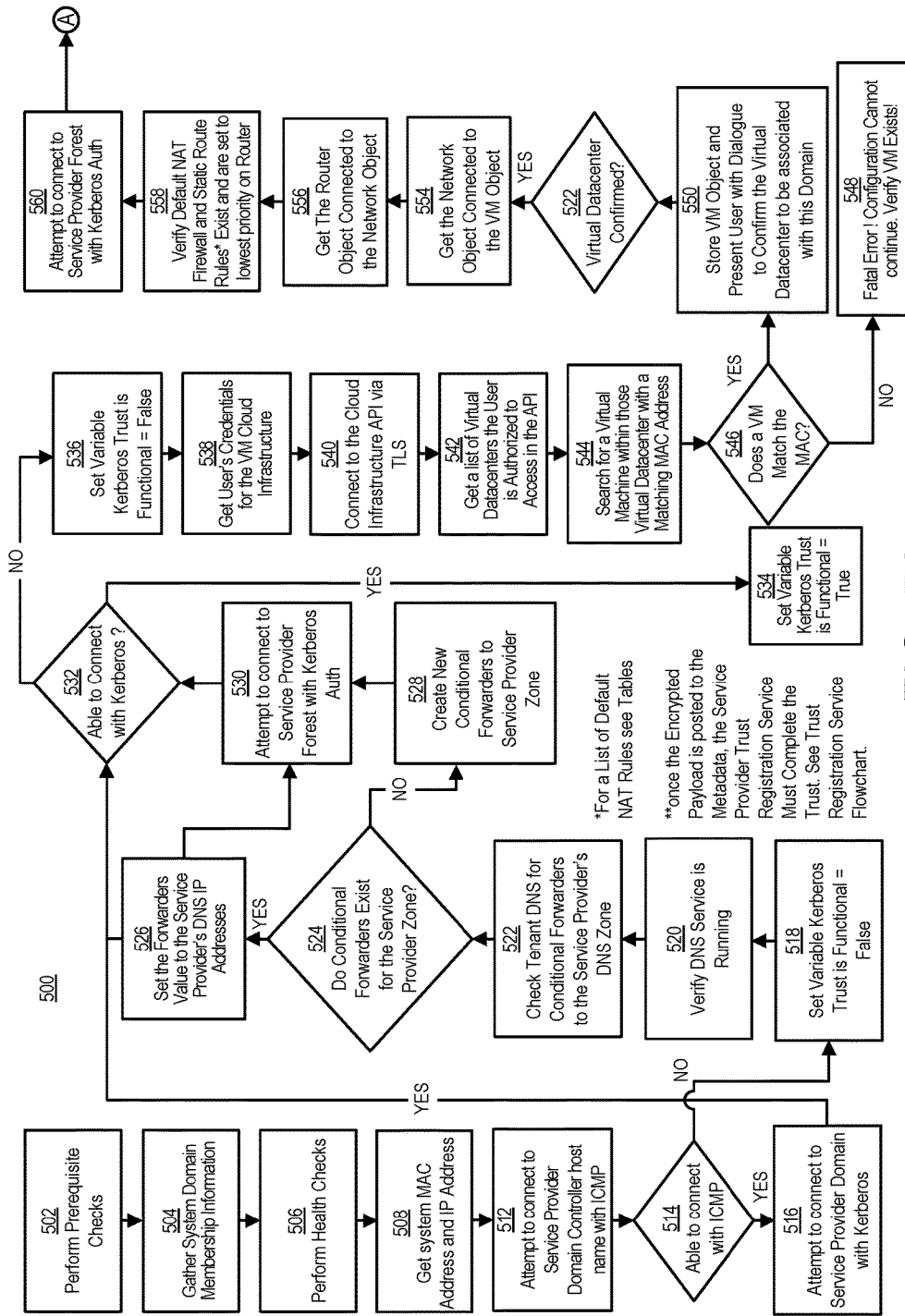
FIG. 5A-B illustrate a process of configuring the directory server by a tenant using a scripted process to create the tenant side of the Kerberos trust.
Figure 5B:
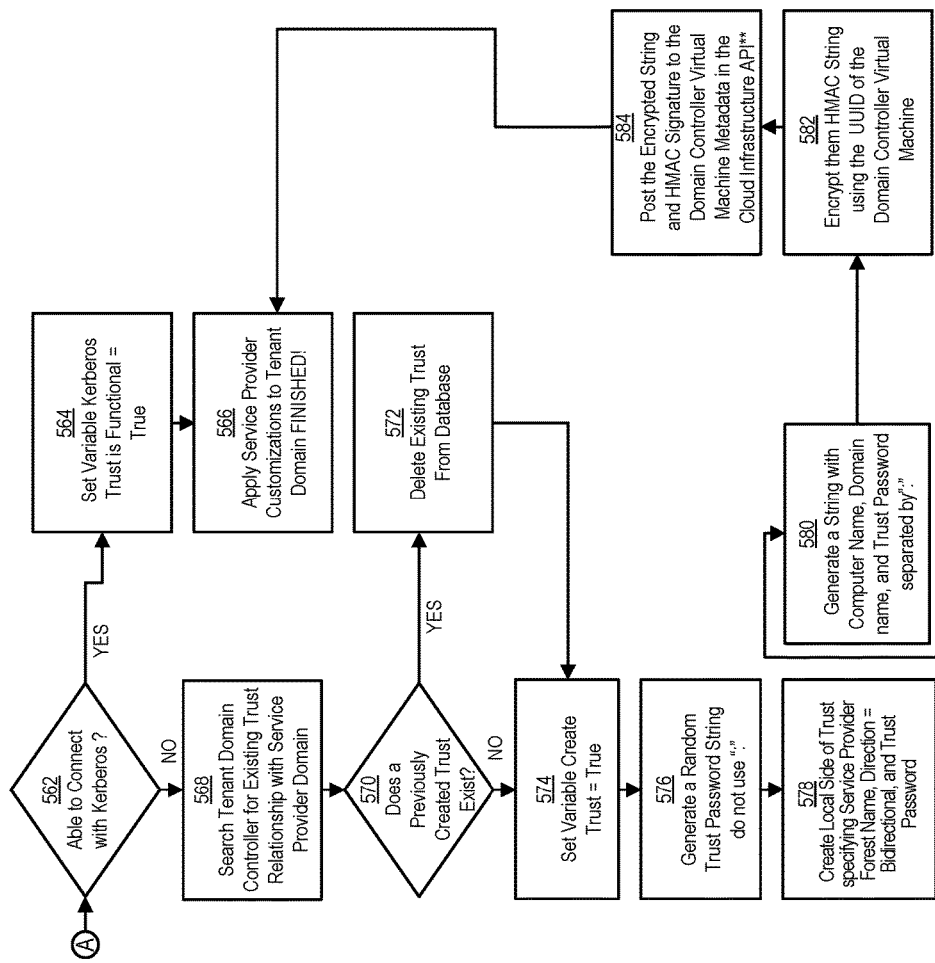

FIG. 5 illustrates a scripted process 500 of configuring the directory server 212/222 by a tenant. This process is tenant agnostic and requires little interaction or decision making by tenant. The process described in FIG. 5A-B is also presented in diagnostic form, meaning the process pre-supposes the existence of a fully functional cross-realm trust and invokes certain logic to repair or recreate this trust in the event it is not functional. It is therefore assumed that the absence of a trust is a broken trust, which the utility will create for the first time de facto through its diagnostic approach. Accordingly, the initial steps in the process 500 can seem redundant or unnecessary if proceeding under the assumption that the utility is creating the trust for the first time, however the utility uses a diagnostic approach to "learn" that it is actually creating the trust for the first time. Also encompassed here is the approach for creating the trust relationship for the first time through a non-diagnostic context as the diagnostic approach includes those steps for such non-diagnostic approach.

The realm configuration process 500 can be operated from the tenant's security context can perform, at 502, prerequisite checks to ensure that the operating system for the tenant is supported/authorized for configuring the directory server 212/222. The process, executed by the tenant and running under the tenant's security context and running on the tenant's directory server can gather, at 504, system domain membership information i.e. the name of the directory server, the name of the tenant's Kerberos realm ("domain name"). The process can perform, at 506, health checks, such as common issues that can cause the creation of a trust relationship to fail. These health checks are not specific to the invention at issue here, however providing for a place to complete those health checks within the process improves the probability of success of the overall process, and provides useful diagnostic information should the process fail. The process can retrieve, at 508, media access control (MAC) address and IP address of the directory server 212/222.

The process can attempt, at 512, to connect to the cloud service provider's directory server 204 using internet control message protocol (ICMP). This connection can be a means for the tenant to test network connectivity to ensure that the configuration of the directory server is proceeding properly. The process can check, at 514, whether the tenant is able to connect using ICMP. If the process detects at 514 that it is able to connect, the process can attempt, at 516, to connect to the cloud service provider domain with Kerberos.

If the process detects at 514 that it is not able to connect, the cloud service provider can ensure that the directory server 204 is running and that the NAT tables 218/227 include a conditional forwarder that points/directs to the domain of the cloud service provider, as described in the following. The process can thus determine, at 518, whether Kerberos trust is functional. The process can verify, at 520, that the service by directory server 204 is running. The process can check, at 522, the tenant directory server 212/222 for a conditional forwarder that points/directs to the domain of the cloud service provider. The process can check, at 524, whether conditional forwarders exist for the cloud service provider DNS zone. If the process determines at 524 that the conditional forwarders exist, the process can set, at 526, values of the conditional forwarders to the IP address of the directory server 204. If the process determines at 524 that the conditional forwarders do not exist, the process can create, at 528, new conditional forwarders to the cloud service provider DNS zone. The process can attempt, at 530, to connect to the cloud service provider realm 102 with Kerberos authentication.

The process can determine, at 532, whether it is able to connect to the service provider directory server with Kerberos. If the process can determine at 532 that it is able to connect with Kerberos, the process can set, at 534, value of the variable whether Kerberos trust is functional as true. If the process determines at 532 that it is not able to connect with Kerberos, the process can set, at 536, value of the variable whether Kerberos trust is functional as false. The process can prompt for and receive, at 538, authentication credentials of a cloud infrastructure manager server ("fabric controller") API administrator user of the tenant. The authentication credentials are used to connect to the service provider's cloud infrastructure manager server API and can be used to locate the virtual machine object that is running the directory server 212/222. The process can connect, at 540, to an application programming interface (API) for the realm 102. The process can get, at 542, a list of virtual ("software-defined") datacenters that the tenant administrator is authorized to access in the API. The process can search, at 544, within those virtual datacenters for a virtual machine with a matching MAC address of the directory server 212/222.

The process can determine, at 546, whether a virtual machine matches the MAC address of the directory server 212/222. If the process determines at 546 that no virtual machine network interface connections match the MAC address, the process can indicate, at 548, that: an error has occurred, configuration of the directory server 212/222 cannot continue, and the user should verify/check the existence of the virtual machine. If the process determines at 546 that a virtual machine's network interface connection matches the MAC address, the process can store, at 550, the virtual machine API object data (e.g., directory server 212/222), determined the virtual machine's containing virtual data center, and present the tenant administrator user with a dialogue to confirm that the virtual datacenter is the virtual datacenter to be associated with this realm ("domain"). The process can determine, at 552, whether the tenant-assigned virtual datacenter exists. If the process confirms the existence of the tenant-assigned virtual datacenter at 552, the process can get, at 554, the network object (e.g., VXLAN-backed distributed virtual port group 214/224) connected to the virtual machine object (e.g., directory server 212/222). If the process is unable to locate the tenant-assigned virtual datacenter, the process stops, logs an error, and notifies the user to verify the credentials and provided to the process (those credentials being the tenant administrator credentials to connect to the cloud infrastructure API). The process can get, at 556, the router object (e.g., virtual router 216/226) connected to the network object (e.g., VXLAN-backed distributed virtual port group 214/224). The process can verify, at 558, existence of default NAT firewall rules and static route rules in the NAT tables 218/227. If these rules do not exist, the process can dynamically create these rules and set them to the lowest priority on the router. Lowest priority means that these rules will not preempt any other rules the tenant has programed into their router for unrelated purposes. Therefore, the likelihood of this utility "breaking" an existing NAT configuration of the tenant is low.

The process can attempt, at 560, to connect to the realm 102 using Kerberos authentication. The process can determine, at 562, whether the tenant is able to connect to the realm 102. If the process determines at 562 that it has been able to connect to the realm 102, the process can set, at 564, value of the variable whether Kerberos trust is functional as true. The process can apply, at 566, customizations if required by the cloud service provider to the domain of the tenant, and the configuration process ends. If however the process determines at 562 that it has not been able to connect to the realm 102, the process can search, the directory server 212/222 for existing trust relationship with the directory server 204.

The process can determine, at 570, whether a previously created trust relationship between the directory server 212/222 and the directory server 204 exists. If the process determines at 570 that a previously created trust relationship between the directory server 212/222 and the directory server 204 exists, the process can delete the existing trust relationship from the database. This is a database that exists on the Directory Server and is generally also used by the Kerberos service running on the Directory Server. If the process determines at 570 that there is no previously created trust relationship between the directory server 212/222 and the directory server 204, or after 572, the process can set the variable create trust as true.

The process can generate, at 576, a random trust password string where ":" is reserved as a delimiter character. The process can create, at 578, a local side of the trust by specifying: the cloud service provider, the name of the realm 102, direction as being bidirectional, and a password for the trust. The process can generate, at 580, a string ("the string") with the directory server computer name, realm name, and the randomly generated trust password. Each item, being delimited by a semicolon ":". The semicolon being used as it is an illegal character for the trust password, computer name, and real name. The process can encrypt, at 582, the string using a universally unique identifier (UUID) of the virtual machine characterizing the directory server 212/222. The process can compute the hash message authentication code (HMAC) of this encrypted sting. The process can POST, at 584, the encrypted string and HMAC signature to the metadata of the virtual machine characterizing the directory server 212/222 in the cloud infrastructure API. Once the encrypted string and HMAC signature is posted to the virtual machine's metadata, the cloud service provider trust registration must complete the trust. The process of cloud service provider trust registration is described by FIG. 6. The process can apply, at 566, any other customizations by the cloud service provider to the realm of the tenant, and the configuration process ends.

Figure 6:
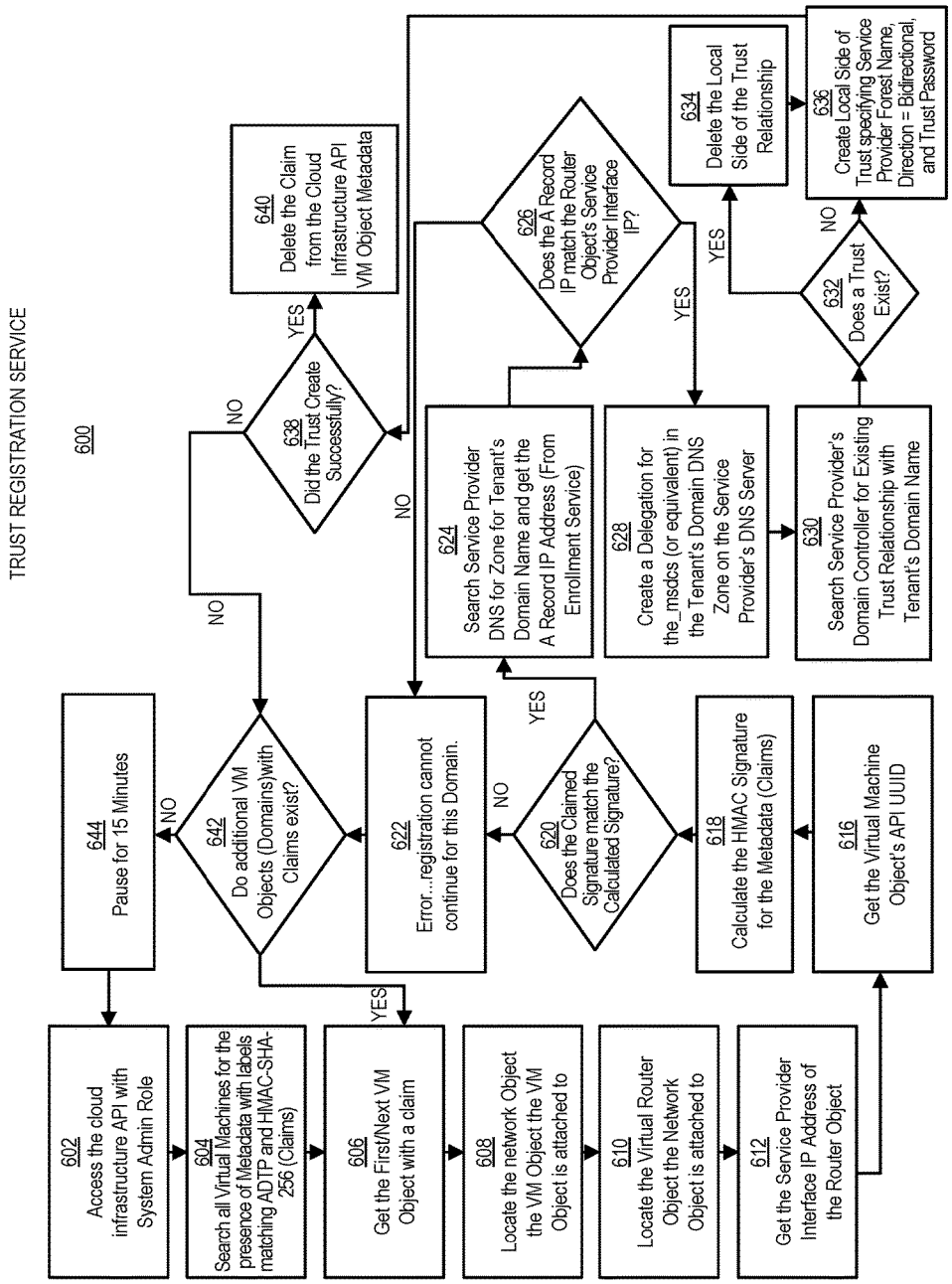
FIG. 6 illustrates a process performed by the cloud service provider for registering a trust relationship between a directory server of the tenant and a directory server of the cloud service provider.

FIG. 6 illustrates a scripted process 600 performed by the cloud service provider for completing a trust relationship between a directory server such as 212 or 222 of a tenant and the directory server 204 of the cloud service provider once the scripted process 500 has been successfully executed by a tenant. The trust registration service process 600 can run periodically (e.g., at intervals of a preset period, such as 15 minute). This process can run on the cloud service provider's directory server 204, or on a dedicated server within realm 102 with network access to the directory server 204 and the Cloud Infrastructure Manager ("fabric controller") API. This process must run from within a security context that allows administrator access to the cloud Infrastructure API and the ability to create and delete trust relationships between realm 102 and other realms.

The process, running under the cloud service provider's security context and on a server in realm 102 can access (e.g., by logging in), at 602, the cloud infrastructure server API using a system administrator role. The cloud infrastructure API is the server running a service that enables tenants to interact with and/or control the provisioning of their compute, storage, and network pools, as well as provision their virtual machines and VXLAN-backed virtual distributed port groups on the cloud service provider-managed datacenter or IaaS. When the cloud service provider logs in to the Cloud Infrastructure Manager API, it can see the tenant-virtual machine hierarchy. The service provider can search, at 604, all virtual machines for the presence of metadata in the form of name-value pairs. The encrypted payload value is the encrypted string and the HMAC-SHA-256 value is the hash message authentication code signature value for the original string.

The process can get, at 606, a first/next virtual machine object (e.g., directory server 212/222) with a claim. The claim is a posting of such encrypted string and HMAC signature to the Cloud Infrastructure Server API, thus notifying the cloud service provider of a tenant's creation of its side the realm trust and corresponding submission of the password required for the cloud service provider to complete the trust relationship using the same password on the cloud service provider's realm. The process, by accessing the Cloud Infrastructure Server Manager API, can locate, at 608, the network object (e.g., VXLAN-backed distributed virtual port group 214/224) with which the virtual machine object is attached. The process can locate, at 610, the virtual router object (e.g., virtual router 216/226) to which the network object is attached. The process can get, at 612, the tenant's router's second external interface IP address of the router object. This IP address can be the one that the cloud service provider has assigned as a part of the tenant enrollment process 400 described in FIG. 4. The process can get, at 616, the cloud infrastructure API-assigned UUID of the virtual machine object. The process can compute, at 618, the HMAC signature for the metadata/claim for the trust password.

The process can determine, at 620, whether the claimed signature matches the computed signature. If the process determines at 620 that there is no match, the process can indicate, at 622, that an error (e.g., error that the trust password has been tampered with) has occurred and the trust registration is not able to continue for this domain. If the process determines at 620 that there is a match, the process can successfully decrypt the string containing the tenant's directory server name, realm name, and the trust password used by the process 500 to create the tenant's side of the realm trust. The process can search, at 624, the directory server 204 DNS records (229) for the DNS zone for the realm name ("domain name") of the tenant and get the IP address of the A record (as discussed with respect to the tenant enrollment process 400). The process can determine, at 626, whether the IP address of the A record matches the IP address of the router 216/226's interface with the cloud service provider. If the process determines a match at 626, the cloud service provider can create, at 628, a DNS delegation on the cloud service provider DNS server for the _msdcs (e.g., pointing to tenant's Directory Server DNS Name) in the tenant's DNS zone in 229 on the directory server 204.

The process can search, at 630, the directory server 204, for existing trust relationship with tenant's domain name. The process can determine, at 632, whether a trust relationship exists. If the process determines at 632 that a trust relationship exists, the process can delete, at 634, the local side (e.g., side of the realm 102) of the trust relationship. If the process determines at 632 that a trust relationship does not exist, or after 634, the process can create, at 636, the local side of the trust by specifying: the cloud service provider realm 102, the direction as being bidirectional, and the trust password. The process thus ensures that the same trust password programmed into the directory servers of 102 and 104.

The process can determine, at 638, whether the trust was created successfully. If the process determines at 638 that the trust was created successfully, the process can delete, at 640, the claim from the metadata of the virtual machine object (e.g., the directory server 204) within the cloud infrastructure API. If the process determines at 638 that the trust was not created successfully, the process can determine, at 642, whether additional virtual machine objects (e.g., directory server 212/222) with claims exist. If the process determines at 642 that additional virtual machine objects with claims exist (such as for realm 106), the process flow can go to 606. If the process determines at 642 that additional virtual machine objects with claims exist, the process flow can go to 606. If the process determines at 642 that additional virtual machine objects with claims do not exist, the process can pause (e.g., 15 minutes) and then the process flow can go to 602.

Figure 7:
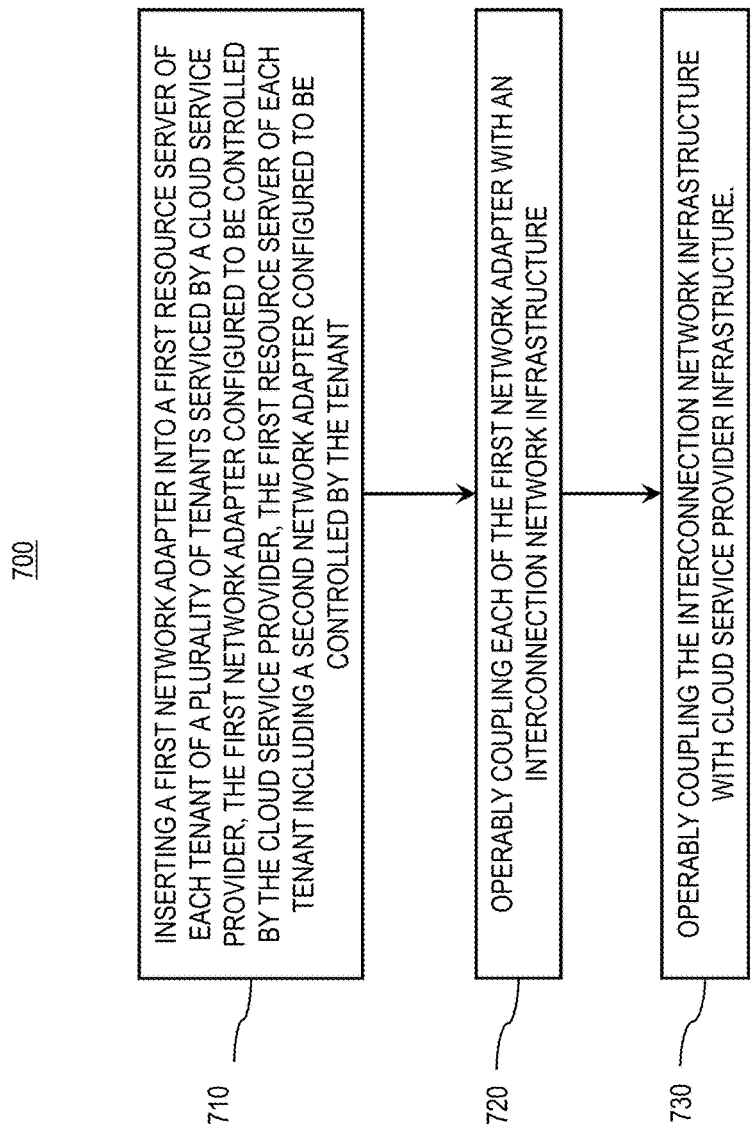
FIG. 7 is a process flow diagram illustrating an example process for configuration a virtual network topology for working around these IP address between tenants on tenants' primary network adapter in a cloud service provider and tenants model without requiring a tenant to reconfigure their topology or adhere to cloud service provider address requirements.

FIG. 7 is a process flow diagram 700 illustrating an example process for configuration a virtual network topology for working with tenant internal network IP address conflicts in an IaaS model without requiring a tenant to reconfigure their topology or adhere to cloud service provider address requirements.

At 710, a first network adapter can be inserted into a first resource server of each tenant of a plurality of tenants serviced by a cloud service provider. The first network adapter's IP Address can be configured by the cloud service provider's DHCP server.

The tenants and cloud service provider can be arranged, for example, as illustrated in FIG. 3. The first resource server of each tenant can include a second network adapter configured to be controlled by the tenant. The tenant includes a first directory server that includes a network adapter configured to be controlled by the tenant. Each of the second network adapter and the third network adapter can be operably coupled to a first VXLAN-backed distributed virtual port group controlled and/or created by the tenant. The first port group can be operably coupled with a router.

At 720, each of the first network adapter can be operably connected with an interconnection network infrastructure. In some implementations, the interconnection network infrastructure can be implemented as illustrated in FIG. 3. Each of the first network adapter and the router can be operably connected or coupled with a second port group, such as a private-vlan backed distributed virtual port group of type isolated and operably coupling the second port group with a third port group, such as a private-vlan backed distributed virtual port group of type promiscuous. The router can be operably connected or coupled with the second port group via a secondary external interface connection. The third port group can be controlled by the cloud service provider. The second port group (of the type isolated) can be controlled by the cloud service provider.

At 730, the interconnection network infrastructure can be operably connected with a cloud service provider infrastructure. With reference to the example described with respect to FIG. 3, this can include operably coupling the third port group with a fourth port group, such as a VLAN-backed distributed virtual port group, via a firewall. The fourth port group (VLAN-backed port group) is controlled by the cloud service provider and the fourth port group is coupled to a second resource server, a second directory server and a dynamic host configuration protocol server of the cloud service provider realm.

The coupling of each of the first network adapter and the router (e.g., the router's second external interface connection) with the second port group of the type isolated that is controlled by the cloud service provider can work around conflicting internet protocol addresses of the primary network adapters of any tenant resource server relative to two or more tenants of the plurality of tenants.

The interconnection network infrastructure can enable communication over the interconnection network infrastructure between the cloud service provider infrastructure and each tenant. The interconnection network infrastructure likewise can disallow, prevent, and/or disable communication over the interconnection network infrastructure between the plurality of tenants.

In some implementations, the second network adapter is largely invisible to applications running on such computers in the tenant network.

In some implementations, the first port group can include a virtual extensible local area network backed distributed port group. The second port group can include a private virtual local area network backed distributed virtual port group of type isolated that is configured to access the third port group such that each tenant is prevented from accessing any other tenant via OSI layers 2-7 over the network.

In some implementations, the third port group can include a promiscuous private virtual local area network-backed distributed virtual port group that is configured to pass network traffic (OSI layers 2-7) originating from any tenant of the plurality of tenants to the service-provider realm, and to provide the requested services to the tenant provided the tenant is authorized for the service/session.

Figure 8:
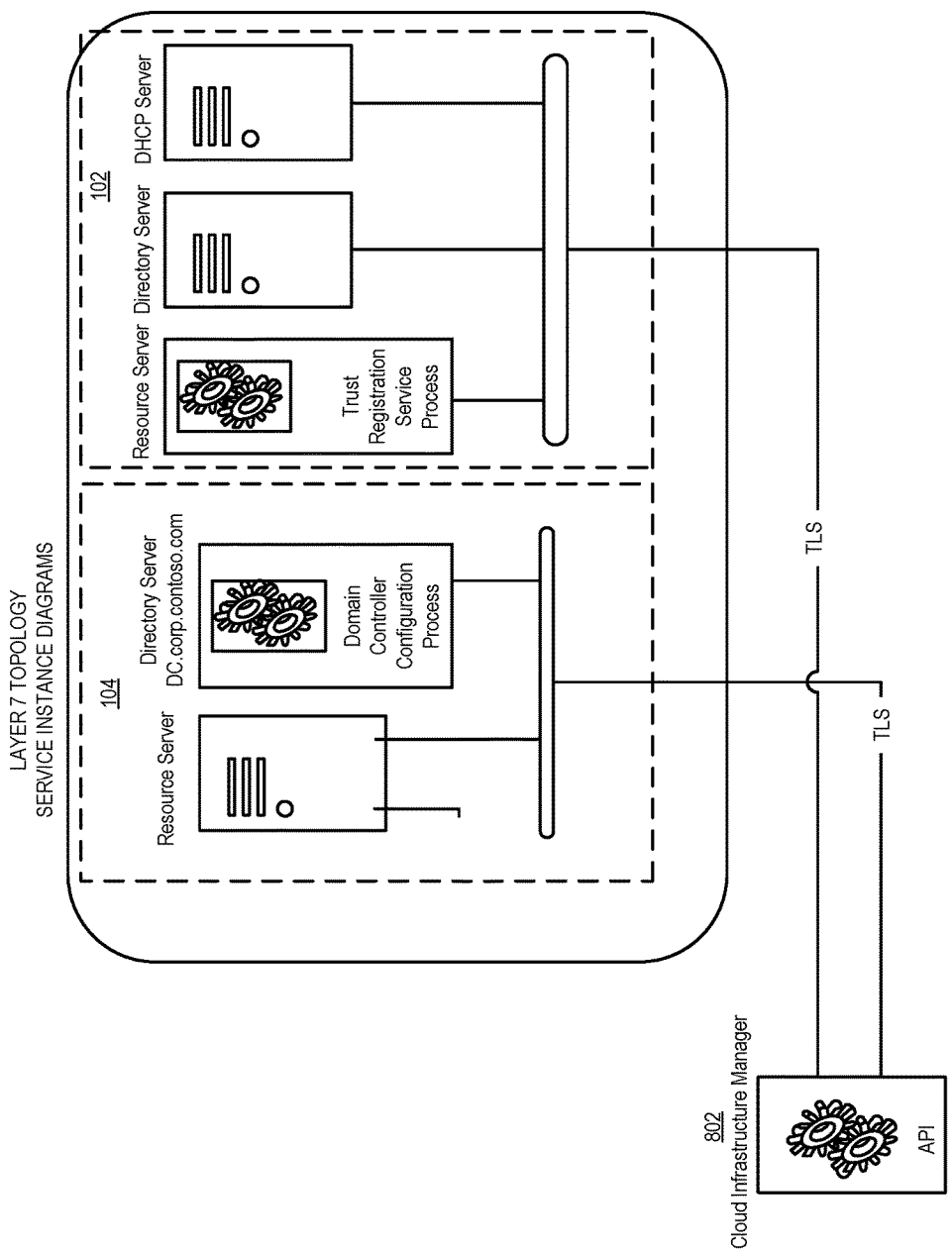
FIG. 8 is a service and process instance diagram illustrating the runtime environments for the processes defined in FIGS. 5 and 6.

FIG. 8 is a service and process instance diagram illustrating the runtime environments for the enrollment processes defined in FIGS. 5 and 6. The process of configuring the directory server by a tenant is executed by the tenant (e.g., on the tenant directory server), in the example of FIG. 8, by tenant Contoso, unless otherwise specified. The scripted process completing the trust relationship between a tenant realm (e.g., 104/106) and the cloud provider realm (e.g., 102) of the cloud service provider can be executed by the service provider (e.g., on the service provider directory server), typically as a scheduled, recurring task, or as a service, unless otherwise specified. Both processes can communicate with the cloud infrastructure manager 802.

Although a few variations have been described in detail above, other modifications can be possible. For example, VLAN port groups can be used in place of VXLAN port groups and vice versa. Virtualization software and/or hypervisor technologies can be used. Other implementations are possible.

As used herein, a domain can be referred to as a realm and/or a forest. Directory server can be referred to as an authentication server and/or a domain controller. For tenant routers, a router external interface may also be referred to as a service-provider assigned interface. Network interface connection can be referred to as a network adapter, NIC, and/or network connection.

In some implementations, it is presumed that the Directory Server is the authentication server, running a Kerberos key distribution center, ticket granting service, and domain name service. In some implementations, when using NTLM in place of kerberos, the directory server need not require a kerberos key distribution center or ticket granting service. In some implementations, when using NTLM, the operating system must be WINDOWS, and the Trust type is an EXTERNAL TRUST, rather than a FOREST TRUST.

Port groups (e.g., network switch segments) may be virtualized by running as a software switch on a hypervisor operating system. Port groups may be distributed, across multiple such hypervisors and physical switches. Distributed virtual port groups may exist on distributed virtual switches for optimal efficiency, examples of such distributed virtual switch software include the VMware vSphere Distributed Switch and/or the Cisco Nexus 1000v distributed virtual switch, for example.

Although the figures and examples only show tenants with a first resource server, tenants can have multiple resource servers. The current subject matter scales for multiple such resource servers.

The currently described subject matter can have many advantages. For example, the networking architecture described herein can allow IP address conflicts with respect to each tenant's internal network. Working around this constraint is advantageous because it allows the cloud service provider to securely distribute value-added network services to each tenant. Examples of such services can include:

(1) Managed secure remote access (e.g., remote application delivery) services over the network through a cloud service provider-managed connection broker and internet-facing access gateway over the cloud service provider network. Specific examples of these services include CITRIX XENAPP, or MICROSOFT REMOTE DESKTOP SERVICES. Reliable remote access is critical when virtual machines are running in a location outside of the tenant's campus such as the cloud service provider's infrastructure (the "cloud").

(2) Security or monitoring services of tenant's virtual machines over the cloud service provider network.

(3) Software as a service (SaaS) for third party software applications and operating systems. This enables tenants to pay for third party software products based on use each billing period. This requires a cloud service provider software inventory services delivered over the cloud service provider network.

(4) Cloud service provider managed key management service (KMS) activation of such third party software (licensed via the cloud service provider) over the cloud service provider network.

(5) Distribution of third party software client access licenses (CALs) over the cloud service provider network.

(6) Secure data exchange over the cloud service provider network between cloud service provider and tenant virtual machines for miscellaneous purposes, including file restore services from managed or self-service virtual machine backup solutions.

(7) Software update services over the network for specific applications running on tenant resource servers.

(8) Tenant's self-service provisioning of virtual machines and the aforementioned services.

(9) Depending on the operating system platform, the creation of Kerberos realm trusts, forest trusts, or external trusts between cloud service provider's realm ("domain") and tenant's realm enabling mutual authentication and secure communication for each of the above services.

(10) Continuity of service provider network services sessions with tenant servers, even when tenant's virtual router or internal network is undergoing changes (i.e. no session disconnects of service provider delivered services due to tenant router configuration changes). This improves end user reliability of the service provider services being used, and provides for easier troubleshooting.

(11) Prevention of Denial of Service due to IP Address conflicts at layer 3 of the OSI model on the cloud service provider network.

(12) Maintains strict layer 2 (of the OSI model) isolation between each tenant to protect tenants from a malicious tenant.

(13) For scalability, tenant's self-service enrollment and scripted setup of tenant's initial engagement with the cloud service provider.

(14) Secure distribution of a baseline of security policies over the network.

(15) Avoids having a tenant reconfigure its internal topology can advantageously maximize convenience for a tenant seeking cloud provider services delivered from the network, which can directly translate to increased revenue for the cloud service provider. The ability of the cloud service provider to offer these network services differentiates the cloud service provider's offerings from other IaaS solutions. This differentiation stems from the ability to offer a set of cloud service provider-managed network services without interfering with tenant's control over the provisioning of the virtual machines network settings and those machines' self-service enrolment in the consumption of these services. This directly translates into better scalability, marketplace exclusivity, and thus increased revenue and lower costs of such revenues for the cloud service provider.

Various implementations of the subject matter described herein can be realized/implemented in digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can have a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications or code) can include machine instructions for a programmable processor, and can be implemented in a high-level procedural and/or object-oriented programming language, and/or in assembly/machine language. As can be used herein, the term "machine-readable medium" can refer to any computer program product, apparatus and/or device (e.g., magnetic discs, optical disks, memory, programmable logic devices (PLDs)) used to provide machine instructions and/or data to a programmable processor, including a machine-readable medium that can receive machine instructions as a machine-readable signal. The term "machine-readable signal" can refer to any signal used to provide machine instructions and/or data to a programmable processor.

To provide for interaction with a user, the subject matter described herein can be implemented on a computer that can receive data from the one or more users via a keyboard, a mouse, a trackball, a joystick, or any other input device. To provide for interaction with the user, other devices can also be provided, such as devices operating based on user feedback, which can include sensory feedback, such as visual feedback, auditory feedback, tactile feedback, and any other feedback. The input from the user can be received in any form, such as acoustic input, speech input, tactile input, or any other input.

The subject matter described herein can be implemented in a computing system that can include at least one of a back-end component, a middleware component, a front-end component, and one or more combinations thereof. The back-end component can be a data server. The middleware component can be an application server. The front-end component can be a client computer having a graphical user interface or a web browser, through which a user can interact with an implementation of the subject matter described herein. The components of the system can be interconnected by any form or medium of digital data communication, such as a communication network. Examples of communication networks can include a local area network, a wide area network, a metropolitan area network, internet, intranet, Bluetooth network, infrared network, or any other network.

The computing system can include clients and servers. A client and server can be generally remote from each other and can interact through a communication network. The relationship of client and server can arise by virtue of computer programs running on the respective computers and having a client-server relationship with each other.

The processes described herein can be implemented by one or more data processors either within a single computing system or distributed among two or more computing systems. Related computer program products and computer systems are also described. The computer program products can comprise non-transitory computer readable media storing instructions, which when executed by at least one data processor of one or more computing systems, can cause the at least one data processor to perform operations herein. The computer systems can include one or more data processors and a memory coupled to the one or more data processors. The memory can temporarily or permanently store instructions that cause at least one processor to perform one or more of the operations described herein.

Although a few variations have been described in detail above, other modifications can be possible. For example, the logic flows or sequences described herein do not require the particular order shown, or sequential order, to achieve desirable results. Further, the features described in different implementations are interchangeable and/or additive to create further implementations, which are also within the scope of this patent application. Other implementations may be within the scope of the following claims.

What is claimed is:

1. A method comprising:
    inserting a first network adapter into a first resource server of each tenant of a plurality of tenants serviced by a cloud service provider, the first network adapter configured to be controlled by the cloud service provider, the first resource server of each tenant including a second network adapter configured to be controlled by the tenant;
    operably coupling each of the first network adapter with an interconnection network infrastructure; and
    operably coupling the interconnection network infrastructure with cloud service provider infrastructure.

2. The method of claim 1, the interconnection network infrastructure enabling communication over the interconnection network infrastructure between the cloud service provider infrastructure and each tenant, the interconnection network infrastructure disallowing communication over the interconnection network infrastructure between the plurality of tenants.

3. The method of claim 1, the tenant further including a first directory server including a third network adapter configured to be controlled by the tenant, each of the second network adapter and the third network adapter operably coupled to a first port group controlled by the tenant, the first port group being operably coupled with a router.

4. The method of claim 3, the operably coupling each of the first network adapter with the interconnection network infrastructure includes:
    operably coupling each of the first network adapter and a second external interface of the router with a second port group of type private virtual local area network isolated, the second port group of the type isolated being controlled by the cloud service provider; and
    operably coupling the second port group with a third port group of a type private virtual local area network promiscuous, wherein each of the second port group and the third port group is controlled by the cloud service provider.

5. The method of claim 4, the operably coupling the interconnection network infrastructure with the cloud service provider infrastructure includes operably coupling the third port group promiscuous with a fourth port group via a firewall, the fourth port group being controlled by the cloud service provider, the fourth port group operably coupled to a second resource server, a second directory server and a dynamic host configuration protocol server of the cloud service provider.

6. The method of claim 5, wherein the coupling of each of the first network adapter and the router with the second port group that is controlled by the cloud service provider works around conflict of internet protocol addresses between the second network adapter of a tenant server and the second network adapter of another tenant server, relative to the cloud service provider network of the plurality of tenants without requiring any tenant to reconfigure a topology of tenant.

7. The method of claim 5, wherein the first network adapter does not participate in intra-tenant communication to a plurality of computers within the tenant, the first network adapter does not register its cloud service provider-assigned internet protocol address in a tenant domain name server, and a service provider-assigned internet protocol address of the first network adapter's is registered in a domain name server of the service provider by the service provider.

8. The method of claim 5, wherein the first port group is a virtual extensible local area network backed distributed port group or a virtual local area network-backed distributed virtual port group.

9. The method of claim 5, wherein the second port group of the type isolated is a private virtual local area network-backed distributed port group, wherein the primary private virtual local area network identity is not equivalent to its secondary private virtual local area network identity, and the second port group is operably coupled with the third port group preventing the tenant from accessing or connecting to any other tenant.

10. The method of claim 5, wherein the third port group of the type promiscuous is a private virtual local area network backed distributed port group that is configured with a same primary private virtual local area network identity as the second port group, and a secondary private virtual local area network identity of the third port group is the same as a primary private virtual local area network identity of the third port group, wherein the third port group is enabled to receive a request for service originated from any tenant of the plurality of tenants and to provide the requested service to the tenant when the tenant is authorized for the service.

11. The method of claim 5, wherein the second port group is operably coupled to the third port group via a private virtual local area network mapping trunk.

12. The method of claim 5, wherein the fourth port group is a virtual local area network-backed distributed port group, wherein the virtual local area network identity is exclusive of any private-virtual local area network identity.

13. The method of claim 5, wherein the fourth port group is operably coupled to the third port group via a firewall.

14. The method of claim 5, wherein the second directory server has a separate trust relationship with the first directory server of each tenant.

15. The method of claim 14, wherein one of the plurality of tenants uses a first scripted process distributed by the cloud service provider and executed on the first directory server of one of the plurality of tenants to create conditional forwarders in tenant DNS, configure the router NAT rules, and initiate the creation of bidirectional Kerberos trust between the tenant's existing or a newly created Kerberos realm and a service provider's realm.

16. The method of claim 15, wherein the service provider assigns an internet protocol address to a second external interface of a virtual router of the one of the plurality of tenants, and
    the service provider creates a domain name server zone for the one of the plurality of tenant's realm name in the service provider domain name server and a record is added to the domain name server zone that resolves a realm name of the one of the plurality of tenants to the assigned internet protocol address.

17. The method of claim 15, wherein a trust password is created by the one of the plurality of tenants via a first scripted process and stored in a cloud infrastructure manager server database along with a directory server name of the one of the plurality of tenants and a realm name of the one of the plurality of tenants.

18. The method of claim 15, wherein a second scripted process executing in the cloud service provider's realm retrieves the trust password from a cloud infrastructure server database by the service provider.

19. The method of claim 17, wherein the second scripted process completes the creation of the cross-realm Kerberos trust where inter-tenant internet protocol address conflicts exist with respect to tenant primary network adapters.

20. A method comprising:
inserting a second network adapter into each resource server of each tenant of a plurality of tenants serviced by a cloud service provider, the first network adapter of each resource server to be fully controlled by the tenant, each resource server of each tenant including a first network adapter configured to be assigned an internet protocol address by the cloud service provider;
inserting a second external network interface connection into a router of each tenant of the plurality of tenants serviced by the cloud service provider;
operably coupling each second network adapter with an interconnection network infrastructure;
operably coupling each second external interface with an interconnection network infrastructure; and
operably coupling the interconnection network infrastructure with cloud service provider infrastructure.

21. A system comprising: at least one data processor; and memory storing instructions, which when executed by the at least one data processor, implement operations comprising:
inserting a first network adapter into a first resource server of each tenant of a plurality of tenants serviced by a cloud service provider, the first network adapter configured to be controlled by the cloud service provider, the first resource server of each tenant including a second network adapter configured to be controlled by the tenant;
operably coupling each of the first network adapter with an interconnection network infrastructure; and
operably coupling the interconnection network infrastructure with cloud service provider infrastructure.

22. The system of claim 21, the interconnection network infrastructure enabling communication over the interconnection network infrastructure between the cloud service provider infrastructure and each tenant, the interconnection network infrastructure disallowing communication over the interconnection network infrastructure between the plurality of tenants.

23. A non-transitory computer program product storing instructions, which when executed by at least one data processor of at least one computing system, implement operations comprising:
inserting a first network adapter into a first resource server of each tenant of a plurality of tenants serviced by a cloud service provider, the first network adapter configured to be controlled by the cloud service provider, the first resource server of each tenant including a second network adapter configured to be controlled by the tenant;
operably coupling each of the first network adapter with an interconnection network infrastructure; and
operably coupling the interconnection network infrastructure with cloud service provider infrastructure.

24. The computer program product of claim 23, the interconnection network infrastructure enabling communication over the interconnection network infrastructure between the cloud service provider infrastructure and each tenant, the interconnection network infrastructure disallowing communication over the interconnection network infrastructure between the plurality of tenants.

25. The computer program product of claim 23, the tenant further including a first directory server including a third network adapter configured to be controlled by the tenant, each of the second network adapter and the third network adapter operably coupled to a first port group controlled by the tenant, the first port group being operably coupled with a router.

26. The computer program product of claim 25, the operably coupling each of the first network adapter with the interconnection network infrastructure includes:
operably coupling each of the first network adapter and a second external interface of the router with a second port group of type private virtual local area network isolated, the second port group of the type isolated being controlled by the cloud service provider; and
operably coupling the second port group with a third port group of a type private virtual local area network promiscuous, wherein each of the second port group and the third port group is controlled by the cloud service provider.

27. The computer program product of claim 26, the operably coupling the interconnection network infrastructure with the cloud service provider infrastructure includes operably coupling the third port group promiscuous with a fourth port group via a firewall, the fourth port group being controlled by the cloud service provider, the fourth port group operably coupled to a second resource server, a second directory server and a dynamic host configuration protocol server of the cloud service provider.

28. The computer program product of claim 27, wherein the coupling of each of the first network adapter and the router with the second port group that is controlled by the cloud service provider works around conflict of internet protocol addresses between the second network adapter of a tenant server and the second network adapter of another tenant server, relative to the cloud service provider network of the plurality of tenants without requiring any tenant to reconfigure a topology of tenant.

29. The computer program product of claim 27, wherein the first network adapter does not participate in intra-tenant communication to a plurality of computers within the tenant, the first network adapter does not register its cloud service provider-assigned internet protocol address in a tenant domain name server, and a service provider-assigned internet protocol address of the first network adapter's is registered in a domain name server of the service provider by the service provider.

30. The computer program product of claim 27, wherein the first port group is a virtual extensible local area network backed distributed port group or a virtual local area network-backed distributed virtual port group.

31. The computer program product of claim 27, wherein the second port group of the type isolated is a private virtual local area network-backed distributed port group, wherein the primary private virtual local area network identity is not equivalent to its secondary private virtual local area network identity, and the second port group is operably coupled with the third port group preventing the tenant from accessing or connecting to any other tenant.

32. The computer program product of claim 27, wherein the third port group of the type promiscuous is a private virtual local area network backed distributed port group that is configured with a same primary private virtual local area network identity as the second port group, and a secondary private virtual local area network identity of the third port group is the same as a primary private virtual local area network identity of the third port group, wherein the third port group is enabled to receive a request for service originated from any tenant of the plurality of tenants and to provide the requested service to the tenant when the tenant is authorized for the service.

33. The computer program product of claim 27, wherein the second port group is operably coupled to the third port group via a private virtual local area network mapping trunk.

34. The computer program product of claim 27, wherein the fourth port group is a virtual local area network-backed distributed port group, wherein the virtual local area network identity is exclusive of any private-virtual local area network identity.

35. The computer program product of claim 27, wherein the fourth port group is operably coupled to the third port group via a firewall.

36. The computer program product of claim 27, wherein the second directory server has a separate trust relationship with the first directory server of each tenant.

37. The computer program product of claim 36, wherein one of the plurality of tenants uses a first scripted process distributed by the cloud service provider and executed on the first directory server of one of the plurality of tenants to create conditional forwarders in tenant DNS, configure the router NAT rules, and initiate the creation of bidirectional Kerberos trust between the tenant's existing or a newly created Kerberos realm and a service provider's realm.

38. The computer program product of claim 37, wherein the service provider assigns an internet protocol address to a second external interface of a virtual router of the one of the plurality of tenants, and
the service provider creates a domain name server zone for the one of the plurality of tenant's realm name in the service provider domain name server and a record is added to the domain name server zone that resolves a realm name of the one of the plurality of tenants to the assigned internet protocol address.

39. The computer program product of claim 37, wherein a trust password is created by the one of the plurality of tenants via a first scripted process and stored in a cloud infrastructure manager server database along with a directory server name of the one of the plurality of tenants and a realm name of the one of the plurality of tenants.

40. The computer program product of claim 37, wherein a second scripted process executing in the cloud service provider's realm retrieves the trust password from a cloud infrastructure server database by the service provider.

41. The computer program product of claim 39, wherein the second scripted process completes the creation of the cross-realm Kerberos trust where inter-tenant internet protocol address conflicts exist with respect to tenant primary network adapters.

42. The system of claim 21, the tenant further including a first directory server including a third network adapter configured to be controlled by the tenant, each of the second network adapter and the third network adapter operably coupled to a first port group controlled by the tenant, the first port group being operably coupled with a router.

43. The system of claim 42, the operably coupling each of the first network adapter with the interconnection network infrastructure includes:
operably coupling each of the first network adapter and a second external interface of the router with a second port group of type private virtual local area network isolated, the second port group of the type isolated being controlled by the cloud service provider; and
operably coupling the second port group with a third port group of a type private virtual local area network promiscuous, wherein each of the second port group and the third port group is controlled by the cloud service provider.

44. The system of claim 43, the operably coupling the interconnection network infrastructure with the cloud service provider infrastructure includes operably coupling the third port group promiscuous with a fourth port group via a firewall, the fourth port group being controlled by the cloud service provider, the fourth port group operably coupled to a second resource server, a second directory server and a dynamic host configuration protocol server of the cloud service provider.

45. The system of claim 44, wherein the coupling of each of the first network adapter and the router with the second port group that is controlled by the cloud service provider works around conflict of internet protocol addresses between the second network adapter of a tenant server and the second network adapter of another tenant server, relative to the cloud service provider network of the plurality of tenants without requiring any tenant to reconfigure a topology of tenant.

46. The system of claim 44, wherein the first network adapter does not participate in intra-tenant communication to a plurality of computers within the tenant, the first network adapter does not register its cloud service provider-assigned internet protocol address in a tenant domain name server, and a service provider-assigned internet protocol address of the first network adapter's is registered in a domain name server of the service provider by the service provider.

47. The system of claim 44, wherein the first port group is a virtual extensible local area network backed distributed port group or a virtual local area network-backed distributed virtual port group.

48. The system of claim 44, wherein the second port group of the type isolated is a private virtual local area network-backed distributed port group, wherein the primary private virtual local area network identity is not equivalent to its secondary private virtual local area network identity, and the second port group is operably coupled with the third port group preventing the tenant from accessing or connecting to any other tenant.

49. The system of claim 44, wherein the third port group of the type promiscuous is a private virtual local area network backed distributed port group that is configured with a same primary private virtual local area network identity as the second port group, and a secondary private virtual local area network identity of the third port group is the same as a primary private virtual local area network identity of the third port group, wherein the third port group is enabled to receive a request for service originated from any tenant of the plurality of tenants and to provide the requested service to the tenant when the tenant is authorized for the service.

50. The system of claim 44, wherein the second port group is operably coupled to the third port group via a private virtual local area network mapping trunk.

51. The system of claim 44, wherein the fourth port group is a virtual local area network-backed distributed port group, wherein the virtual local area network identity is exclusive of any private-virtual local area network identity.

52. The system of claim 44, wherein the fourth port group is operably coupled to the third port group via a firewall.

53. The system of claim 44, wherein the second directory server has a separate trust relationship with the first directory server of each tenant.

54. The system of claim 53, wherein one of the plurality of tenants uses a first scripted process distributed by the cloud service provider and executed on the first directory server of one of the plurality of tenants to create conditional forwarders in tenant DNS, configure the router NAT rules, and initiate the creation of bidirectional Kerberos trust between the tenant's existing or a newly created Kerberos realm and a service provider's realm.

55. The system of claim 54, wherein the service provider assigns an internet protocol address to a second external interface of a virtual router of the one of the plurality of tenants, and
- the service provider creates a domain name server zone for the one of the plurality of tenant's realm name in the service provider domain name server and a record is added to the domain name server zone that resolves a realm name of the one of the plurality of tenants to the assigned internet protocol address.

56. The system of claim 54, wherein a trust password is created by the one of the plurality of tenants via a first scripted process and stored in a cloud infrastructure manager server database along with a directory server name of the one of the plurality of tenants and a realm name of the one of the plurality of tenants.

57. The system of claim 54, wherein a second scripted process executing in the cloud service provider's realm retrieves the trust password from a cloud infrastructure server database by the service provider.

58. The system of claim 56, wherein the second scripted process completes the creation of the cross-realm Kerberos trust where inter-tenant internet protocol address conflicts exist with respect to tenant primary network adapters.

* * * * *